(12) United States Patent
Azulay et al.

(10) Patent No.: US 7,221,708 B1
(45) Date of Patent: May 22, 2007

(54) APPARATUS AND METHOD FOR MOTION COMPENSATION

(75) Inventors: Yakov Azulay, Rehovot (IL); Yohai Falik, Ranana (IL)

(73) Assignee: Emblaze V Con Ltd, Ra'Anana (IL)

( * ) Notice: Subject to any disclaimer, the term of this patent is extended or adjusted under 35 U.S.C. 154(b) by 636 days.

(21) Appl. No.: 10/321,956

(22) Filed: Dec. 16, 2002

(51) Int. Cl.
 *H04N 7/12* (2006.01)

(52) U.S. Cl. ............ 375/240.16; 375/240; 375/240.01; 375/240.12

(58) Field of Classification Search ................ 375/240, 375/240.01, 240.12, 240.16; 382/232
See application file for complete search history.

(56) References Cited

U.S. PATENT DOCUMENTS 5,708,732 A * 1/1998 Merhav et al. ............. 382/232

OTHER PUBLICATIONS

Loeffler, Christoph et. al., "Practical Fast 1-D DCT Algorithms with 11 Multiplications," Proceedings of ICASSP 1989, pp. 988-991.
Merhav, Neri et. al., "A Fast Algorithm for DCT-Domain Inverse Motion Compensation," HP Labs Technical Reports, HPL-95-17, 1995, pp. 1-15.
Froitzheim, Dr. K. et. al., "A Knowledge-Based Approach to JPEG Acceleration," IS&T/SPIE Symposium on Electronic Imaging: Science and Technology, San Jose, USA, Feb. 1995, 13 pgs.

* cited by examiner

*Primary Examiner*—Allen Wong

(57) ABSTRACT

An apparatus and method for generating a motion compensated matrix, the method includes the steps of: (i) providing a motion vector and at least one input matrix of DCT coefficients; (ii) selecting at least one conversion transform (CT) and at least one inverse conversion transform (ICT) in response to a content of the motion vector; and (iii) applying the at least one selected ICT and the at least one selected CT to provide a motion compensated matrix.

28 Claims, 20 Drawing Sheets

APPARATUS AND METHOD FOR MOTION COMPENSATION

The present invention relates to manipulating video streams.

BACKGROUND OF THE INVENTION

The Discrete Cosine Transform

A two dimensional DCT converts an input matrix of N×N spatial domain elements to a matrix of N×N DCT coefficients. In many standard video compression schemes N=8. A two dimensional DCT may be implemented by applying a one dimensional DCT over the rows of the input matrix to provide a row-transformed matrix and them applying a one dimensional DCT over the columns of the row-transformed matrix. Those of skill in the art will appreciate that the same result is achieved when applying a one dimensional DCT over the columns of the input matrix to provide a column-transformed matrix and then applying a one-dimensional DCT over the column-transformed matrix to provide the matrix of N×N DCT coefficients.

A plurality of fast algorithms for performing the DCT was introduced by C. Loeffer, A. Ligtenberg and G. S. Moschytz ("Practical fast 1-d DCT algorithms with 11 multiplications", in Proceedings of ICASSP 1989, pp. 988-991.). Loeffer et al suggest a four stage DCT for conversion of input matrix of 8×8. Each stage is executed in series while the calculation within each stage may be calculated in parallel. The mentioned above article includes a graphical illustration of four-stage algorithms. One of their algorithms may also be illustrated by the following sets of equations:

$A0=I0+I7; A1=I1+I6; A2=I2+I5; A3=I3+I4; A4=I3-I4; A5=I2-I5; A6=I1-I6; A7=I0-I7.$ $B0=A0+A3; B1=A1+A2; B2=A1=A2; B3=A0-B3; B4,B7=ROT(C3)[A4,A7]; B5, B6=ROT(C3)[A5,A7];$ $C0=B0+B1; C1=B0-B1; C2,C3=ROT(\sqrt{2}C1)[B2,B3]; C4=B4+B6; C5=B7-B5; C6=B4-B6; C7=B5+B7;$ $O0=C0; O1=C7+C4; O2=C2; O3=\sqrt{2}C5; O4=C1; O5=\sqrt{2}C6; O6=C3; O7=C7-C4$ Whereas each of these equation sets corresponds to a single stage, I0–I7 are the inputs signals to the DCT transform, O0–O7 are further divided by the constant $\sqrt{8}$ to provide the outputs of the DCT, A0–A7 are the intermediate results of the first stage of the DCT; B0–B7 are the intermediate results of the second stage of the DCT; C0–C7 are the intermediate results of the third stage of the DCT; and the ROT denoted a rotation operation. A rotation operation by k C n is illustrated by the following equations, whereas E1 and E2 are the inputs of the rotation operation while F1 and F2 are the outputs of the rotation operation:

$F1=E1*k*\cos(n\pi/2N)+E2*k*\sin(n\pi/2N)$ $F2=-E1*k*\sin(n\pi/2N)+E2*k*\cos(n\pi/2N)$ The upper equation is also referred to as UP_ROT, whereas the lower equation is also referred to as LOW_ROT.

Loeffer et al suggested four other first stages that are illustrated by the following equation sets:

$A0=I0+I7; A1=I1+I2; A2=I1-I2; A3=I3+I4; A4=I3I4; A5=I5+I6; A5=I5-I6; A7=I0-I7.$ $A0=I0+I7; A1=I5+I1; A2=I6+I2; A3=I3+I4; A4=I3-I4; A5=I1-I5; A6=I2-I6; A7=I0-I7.$ $A0=I0+I3; A1=I6+I1; A2=I5+I2; A3=I0-I3; A4=I7+I4; A5=I2-I5; A6=I1-I6; A7=I4-I7.$ $A0=I0+I4; A1=I6+I1; A2=I5+I2; A3=I3+I7; A4=I0-I4; A5=I2-I5; A6=I1-I6; A7=I3-I7.$

For convenience of explanation these first stages are referred to as S12, S13, S14 and S15 respectively.

Loeffer et al further suggests to reverse the second and third stages of the even part (the part that calculates outputs O1, O3, O5 and O7). They also suggested sixteen additional combinations of a sequence that includes the second, third and fourth stages of the even part.

It is noted that the inverse DCT (IDCT) can be implemented by the same algorithms, but in reverse order.

Video Compression Schemes

Digital video must be extensively compressed prior to transmission and storage, as each picture includes multiple pixels, and each pixel has three color-difference multi-bit values.

Standard compression schemes (such as the MPEG compression standards, JPEG, H.263 and others) utilize multiple compression techniques to achieve a very significant compression ratio.

JPEG compression scheme includes the following steps: (i) color space conversion—converting a matrix of RGB pixel values to a matrix of luminance and chrominance values (YUV); (ii) Spatial transform of applying a Discrete Cosine Transform (DCT) upon the YUV matrix to provide a matrix of frequency coefficients, each frequency coefficient describes how much of a given spatial frequency is present; (iii) quantization, during which each spatial coefficient is divided by a quantizing factor such that small spatial coefficients are truncated to zero; (iv) zig-zag scanning and run-length coding the quantized matrix, for achieving a compressed representation of the quantized matrix, as a typical quantized matrix includes many zero-value coefficients; and (v) variable length coding, such as Huffman coding, to provide a compressed matrix.

K. Froitzheim and H. Wolf, "A knowledge based approach to JPEG acceleration", IS&T/SPIE Symposium on Electronic Imaging: Science and Technology. San Jose, USA, Feb. '95. Offers an algorithm to reduce the complexity of JPEG compliant image processing. Froitzheim et el suggests to reduce the amount of operations involved in calculating IDCTs by applying the IDCT transform only to rows or columns of a matrices of DCT coefficient (or semi-transformed matrix) that include at least one non-zero element. Accordingly, before applying a row-wise IDCT, the rows of the matrix are checked to locate rows that include at least one non-zero element. Before applying a column-wise IDCT, the columns of the matrix are checked to locate columns that include at least one non-zero element.

Various compression schemes (such as the MPEG compression schemes) further improve compression rates by addressing a sequence of video frames and taking advantage of the temporal redundancy. Accordingly, compressed video includes target video elements (such as 8×8 blocks, slices, or frames) that may be predicted by a reference video element and additional information representative of the difference between the reference video element and the target video element. This prediction is also termed motion compensation.

For example, MPEG-2 standard defines three types of frames, I-frames, B-frames and P-frames. I-frames are independent in the sense that they include the entire information that is required for displaying a picture. A P-frame is decoded in response to information embedded within a previous frame, while a B-frames is decoded in response to information embedded within both a preceding and succeeding frame. The prediction is done in the picture domain on an 8×8 block basis. Each 8×8 target block is compared to the content of the reference frame (the previous frame in the case of the P-frame) to find the best matching group of 8×8 reference elements (e.g.—the reference block). The offset between each 8×8 target block and the reference block is embedded within a motion vector. It is noted that the reference block may not be aligned with the 8×8 blocks of the reference frame, and may intersect with up to four blocks (e.g.—reference blocks).

N. Merhav and V. Bhaskaran acknowledge that in order to perform various manipulations on compressed video streams there is a need to include motion compensation elements within blocks. They suggest an algorithm for motion compensation, at "A Fast Algorithm for DCT-Domain Motion compensation", HP Labs Technical Reports, HPL-95-I7, 1995 and at U.S. Pat. No. 5,708,732. As noted above, the target block may intersect with multiple reference blocks. In the case of 8×8 blocks, the horizontal offset (as well as the vertical offset) between the target block and a reference blocks can vary between 0 and 7. The offset is embedded within the motion vector. Merhav and Bhaskaran suggest to implement the insertion of motion compensation elements by performing matrix multiplications, whereas some of the matrix are pre-calculated and are selected in response to the horizontal as well as the vertical offset between the target block and an reference block. It is noted that this algorithm is based upon multiple matrix multiplications and is relative complex and resource consuming.

SUMMARY OF THE INVENTION

The invention provides a method and an apparatus for generating a motion compensated matrix, and a computer readable medium having code embodied therein for causing an electronic device to perform the steps of: providing a motion vector and at least one input matrix of DCT elements; selecting at least one conversion transform (CT) and at least one inverse conversion transform (ICT) in response to a content of the motion vector; applying the at least one selected ICT and the at least one selected CT to provide a motion compensated matrix.

The invention provides an apparatus and method for generating a motion compensated matrix, the method includes the following steps: (i) receiving a motion vector and selecting a group of reference blocks that belong to a reference picture and determining a horizontal offset H and a vertical offset V between the members of the group and a target block; (ii) selecting a row wise ICT and a row wise CT in response to H; (iii) applying the selected row wise ICT on rows of two reference blocks to provide a first intermediate matrix; (iv) applying the selected row wise ICT on rows of other two reference blocks to provide a second intermediate matrix; (v) selecting a column wise ICT and a column wise CT in response to V; (vi) applying the selected column wise ICT on the columns of the first and second intermediate matrixes to provide a third intermediate matrix; (vii) applying the selected column wise CT on the columns of the third intermediate matrix to provide a fourth intermediate matrix; (viii) applying the selected row wise CT on the rows of the forth intermediate matrix to provide a motion compensated matrix. The method may also include an additional step of dividing the elements of the motion compensated by a normalization factor.

The invention provides an apparatus and method for generating a motion compensated matrix, including the steps of: receiving a motion vector and selecting a group of reference blocks that belong to a reference picture and determining a horizontal H and a vertical offset V between the members of the group and a target block; selecting a column wise ICT and a column wise CT in response to V; applying the selected column wise ICT on columns of two reference blocks to provide a first intermediate matrix; applying the selected column wise ICT on columns of other two reference blocks to provide a second intermediate matrix; selecting a row wise ICT and a row wise CT in response to H; applying the selected row wise ICT on the rows of the first and second intermediate matrixes to provide a third intermediate matrix; applying the selected row wise CT on the rows of the third intermediate matrix to provide a fourth intermediate matrix; applying the selected column wise CT on the column of the fourth intermediate matrix to provide a motion compensated matrix. The method may also include an additional step of dividing the elements of the motion compensated by a normalization factor.

BRIEF DESCRIPTION OF THE DRAWINGS

Further features and advantages of the invention will be apparent from the description below. The invention is herein described, by way of example only, with reference to the accompanying drawings, wherein.

DETAILED DESCRIPTION OF THE EMBODIMENTS

Figure 1A:
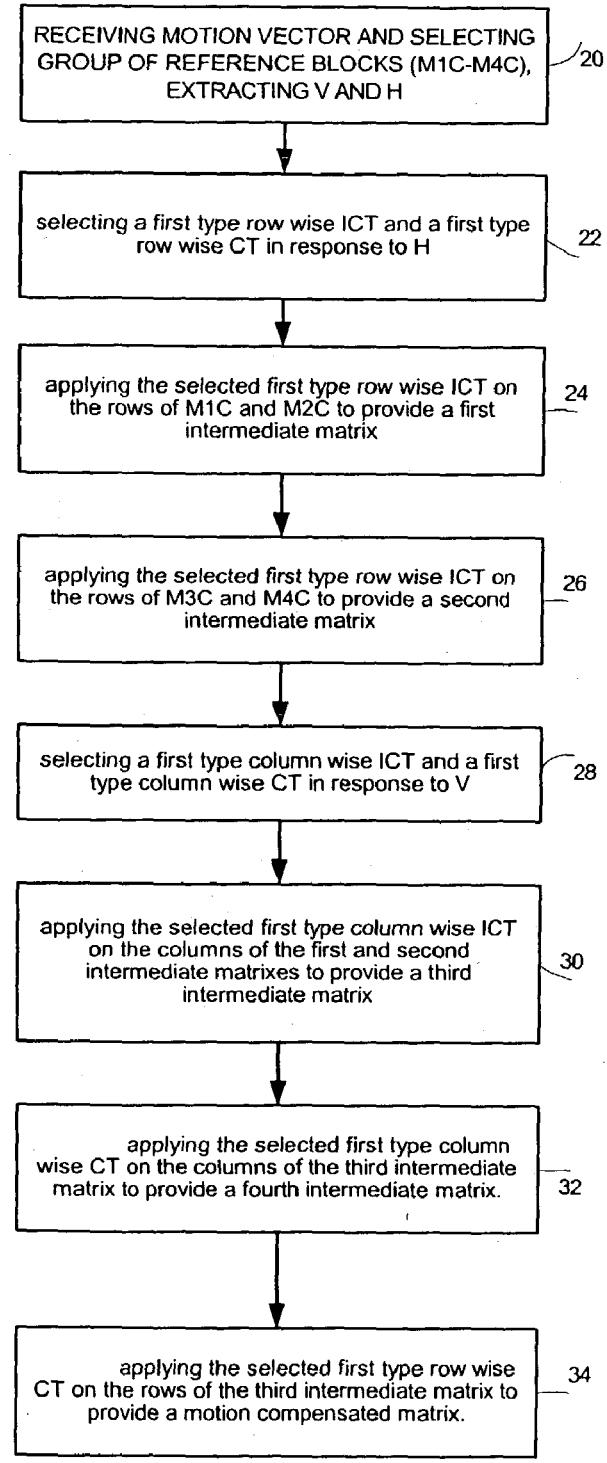
FIGS. 1a–1c illustrate methods for motion compensation information enhancement, in accordance to various embodiments of the invention.

According to various aspects of the invention the system and method for removing motion compensation information that utilize concise transforms such as a first type and second type conversion transform (CT) and inverse conversion transforms (ICT) perform cosine discrete operation and inverse cosine discrete operations but are characterized by fewer computations than prior art DCT and IDCT.

Each ICT if further operable to receive multiple input elements are to generate a fewer amount of output elements. The ICT are designed so as to omit calculations that are not required for the generation of these output elements.

Preferably, an ICT is operable to receive two input N×N matrixes and to output a single N×N matrix. Applying ICT and CT on DCT coefficient matrix provides a motion compensated matrix that includes motion compensation information and may be processed without requiring previous matrixes or preceding matrixes.

According to various aspects of the invention a first type of CT and ICT are presented wherein an amount of calculations is reduced by omitting calculations that cancel each other during a sequence that includes applying a ICT that is followed by applying a CT. Usually, calculations that belong to the last stage of a multi-stage first type ICT as well as reciprocal calculations that belong to the first stage of a multistage CT are omitted.

According to yet a further aspect of the invention a second type of CT and ICT are introduced. The second type CT and ICT are even more concise than the first type CT and ICT. The reduction results from the manner in which the ICT and CT are applied during the motion compensation information enhancement process. Usually, the ICT is applied more times than the CT. Accordingly, shifting some calculations from the ICT to the CT results in an overall reduction in the amount of calculations.

According to another aspect of the invention at least one pair of CT and ICT are tailored to each offset value.

According to yet a further aspect of the invention the CT and ICT are either two-dimensional of one-dimensional. Applying a row-wise CT and then applying a column-wise CT (or vice verse) is equivalent to an appliance of a two dimensional CT. The same follows for the ICT.

The invention provides a method for generating a motion compensated matrix, the method including the following steps: (i) providing a motion vector and at least one input matrix of DCT compressed elements; (ii) selecting at least one conversion transform (CT) and at least one inverse conversion transform (ICT) in response to a content of the motion vector, and (iii) applying the at least one selected ICT and the at least one selected CT to provide a motion compensated matrix.

For simplicity of explanation it is assumed that a row wise ICT is applied prior to a column wise ICT and that each blocks include 8×8 elements. A group of reference blocks includes an upper left reference block (M1), an upper right reference block (M2), a lower left reference block (M3) and a lower right reference block (M4). A vertical offset V is measured from the upper row of M1 and M2 to the upper row of the target block TB, and a horizontal offset H is measured from the most left-hand column of M1 and M3 to the most left-hand column of TB. The compressed representation of M1–M4 and EB are denoted M1C–M4C and EBC accordingly.

First Embodiment of Motion Compensation Information Enhancement

Figure 1B:
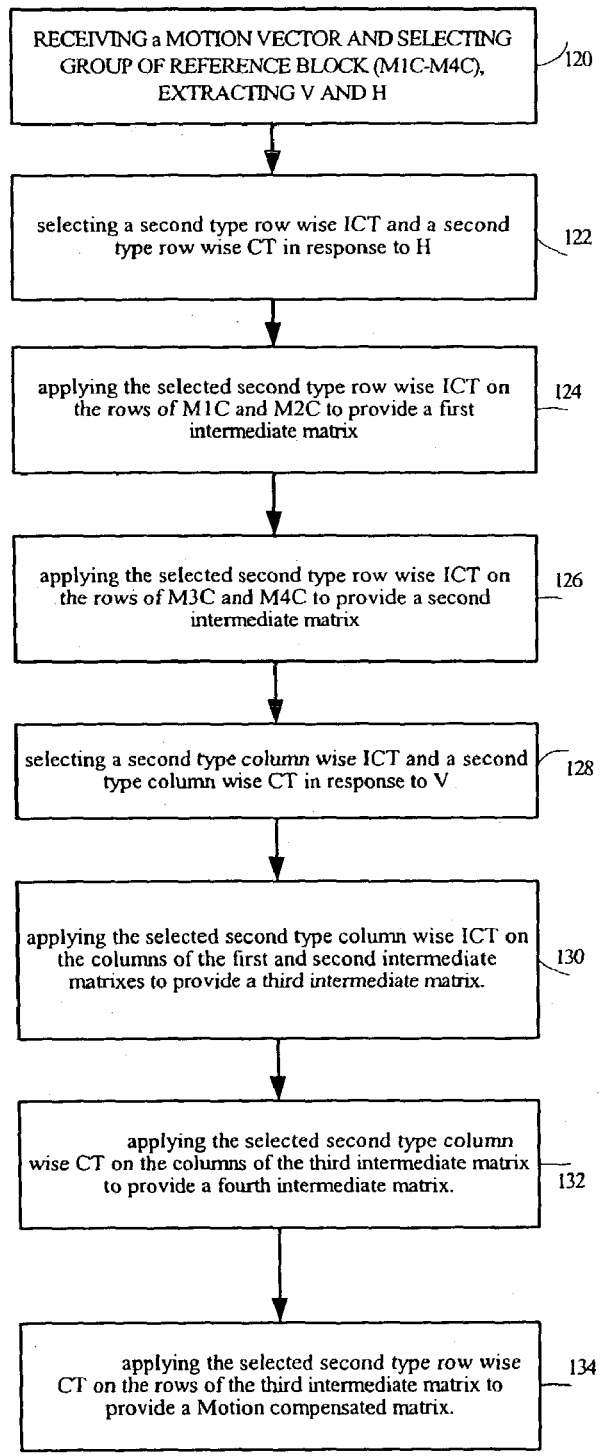
Figure 1C:
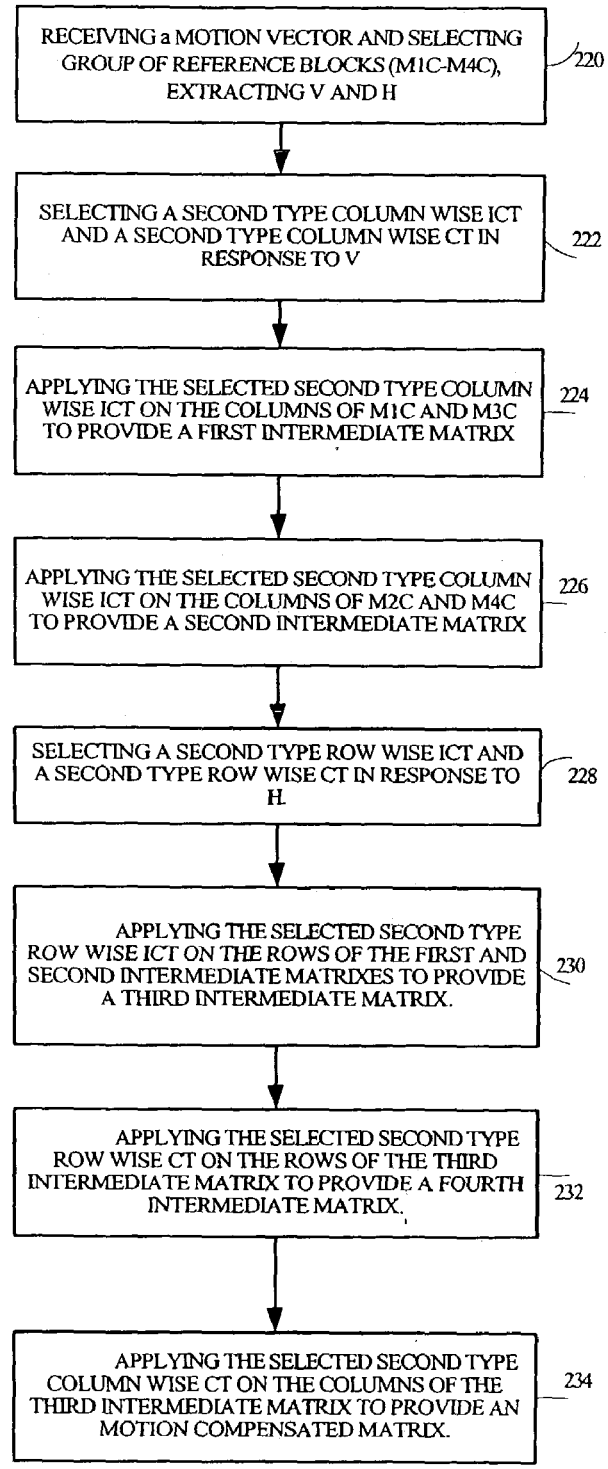

FIGS. 1a–1c illustrate methods for motion compensation information enhancement, in accordance to various embodiments of the invention.

Method 21 of FIG. 1a starts by step 20 of receiving a motion vector and selecting a group of reference blocks (denoted M1C–M4C) that belong to a reference picture as well as determining a horizontal H and a vertical offset V between the members of the group (actually the upper left element of M1C) and the target block TC. Usually, the motion vector is associated with a certain block of a target picture that belongs to a compressed video stream. The motion vector defined an offset between that certain block and the reference block. The motion compensation information enhancement operates on a block to block basis, so that said method is repeated for all blocks of the target picture.

Step 20 is followed by step 22 of selecting a first type row wise ICT and a first type row wise CT in response to H. As illustrated below, for N=8 there are seven first type row wise ICT and CT, each best fits a certain H value.

Step 22 is followed by step 24 of applying the selected first type row wise ICT on the rows of M1C and M2C to provide a first intermediate matrix. It is noted that during each iteration out of the eight iterations of step 24 a single row of M1C as well as a corresponding single row of M2C are processed, to provide a single row of the first intermediate matrix.

Step 24 is followed by step 26 of applying the selected first type row wise ICT on the rows of M3C and M4C to provide a second intermediate matrix.

Step 26 is followed by step 28 of selecting a first type column wise ICT and a first type column wise CT in response to V. As illustrated below, for N=8 there are seven first type column wise ICT and CT, each best fits a certain V value.

Step 28 is followed by step 30 of applying the selected first type column wise ICT on the columns of the first and second intermediate matrixes to provide a third intermediate matrix. It is noted that during each iteration out of the eight iterations of step 30 a single column of the first intermediate matrix as well as a corresponding column of the second intermediate matrix are processed, to provide a single column of the third intermediate matrix.

Step 30 is followed by step 32 of applying the selected first type column wise CT on the columns of the third intermediate matrix to provide a fourth intermediate matrix.

Step 32 is followed by step 34 of applying the selected first type row wise CT on the rows of the third intermediate matrix to provide a motion compensated matrix.

FIGS. 1b and 1c illustrate that the order of some of the mentioned above steps may be changed (for example, applying a first type column wise ICT before applying a first type row wise ICT) and that second type CT and ICT may be implemented instead of first type CT and ICT.

For simplicity of explanation all the intermediate matrix are described by the same terms, throughout FIGS. 1a–1c, although they differ from each other.

Method 121 of FIG. 1b starts by step 120 of receiving a motion vector and selecting a group of reference blocks (denoted M1C–M4C) that belong to a reference picture as well as determining a horizontal H and a vertical offset V between the members of the group (actually the upper left element of M1C) and the target block TB.

Step 120 is followed by step 122 of selecting a second type row wise ICT and a second type row wise CT in response to H. As illustrated below, for N=8 there are seven second type row wise ICT and CT, each best fits a certain H value.

Step 122 is followed by step 124 of applying the selected second type row wise ICT on the rows of M1C and M2C to provide a first intermediate matrix. It is noted that during each iteration out of the eight iterations of step 124 a single row of M1C as well as a corresponding single row of M2C are processed, to provide a single row of the first intermediate matrix.

Step 124 is followed by step 126 of applying the selected second type row wise ICT on the rows of M3C and M4C to provide a second intermediate matrix.

Step 126 is followed by step 128 of selecting a second type column wise ICT and a second type column wise CT in response to V. As illustrated below, for N=8 there are seven second type column wise ICT and CT, each best fits a certain V value.

Step 128 is followed by step 130 of applying the selected second type column wise ICT on the columns of the first and second intermediate matrixes to provide a third intermediate matrix. It is noted that during each iteration out of the eight iterations of step 30 a single column of the first intermediate matrix as well as a corresponding column of the second intermediate matrix are processed, to provide a single column of the third intermediate matrix.

Step 130 is followed by step 132 of applying the selected second type column wise CT on the columns of the third intermediate matrix to provide a fourth intermediate matrix.

Step 132 is followed by step 134 of applying the selected second type row wise CT on the rows of the third intermediate matrix to provide a motion compensated matrix.

Method 221 of FIG. 1c starts by step 220 of receiving a motion vector and selecting a group of reference blocks (denoted M1C–M4C) that belong to a reference picture as well as determining a horizontal H and a vertical offset V between the members of the group (actually the upper left element of M1C) and the target block TB.

Step 220 is followed by step 222 of selecting a second type column wise ICT and a second type column wise CT in response to V. As illustrated below, for N=8 there are seven second type column wise ICT and CT, each best fits a certain H value.

Step 222 is followed by step 224 of applying the selected second type column wise ICT on the columns of M1C and M3C to provide a first intermediate matrix. It is noted that during each iteration out of the eight iterations of step 24 a single column of M1C as well as a corresponding single column of M3C are processed, to provide a single column of the first intermediate matrix.

Step 224 is followed by step 226 of applying the selected second type column wise ICT on the columns of M2C and M4C to provide a second intermediate matrix.

Step 226 is followed by step 228 of selecting a second type row wise ICT and a second type row wise CT in response to H. As illustrated below, for N=8 there are seven second type row wise ICT and CT, each best fits a certain H value.

Step 228 is followed by step 230 of applying the selected second type row wise ICT on the rows of the first and second intermediate matrixes to provide a third intermediate matrix.

Step 230 is followed by step 232 of applying the selected second type row wise CT on the rows of the third intermediate matrix to provide a fourth intermediate matrix.

Step 232 is followed by step 234 of applying the selected second type column wise CT on the columns of the third intermediate matrix to provide a motion compensated matrix.

First Type CT and ICT Functions

Figure 2A:
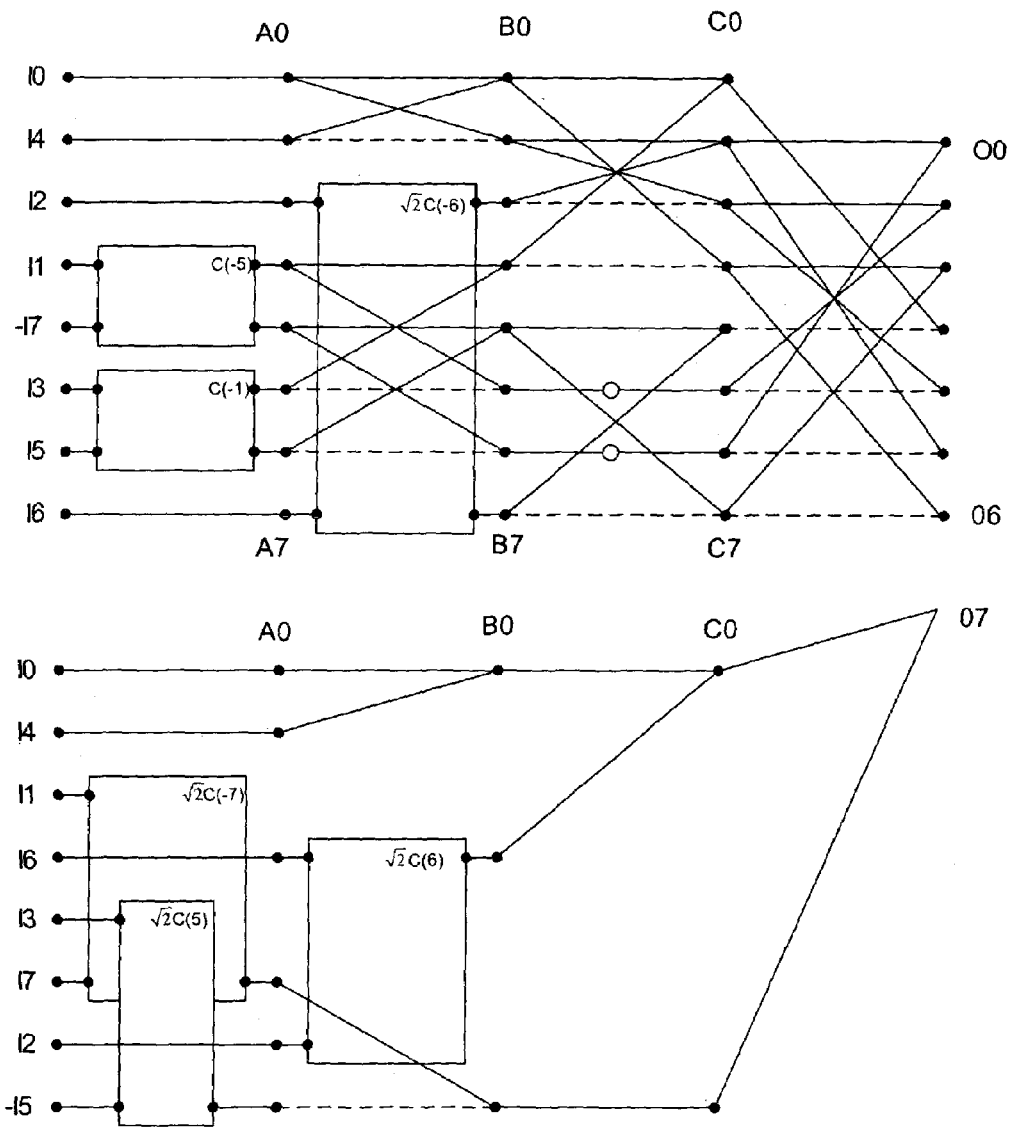
FIGS. 2a and 2b illustrate a first type ICT and a first type CT, in accordance to an aspect of the invention.
Figure 2B:
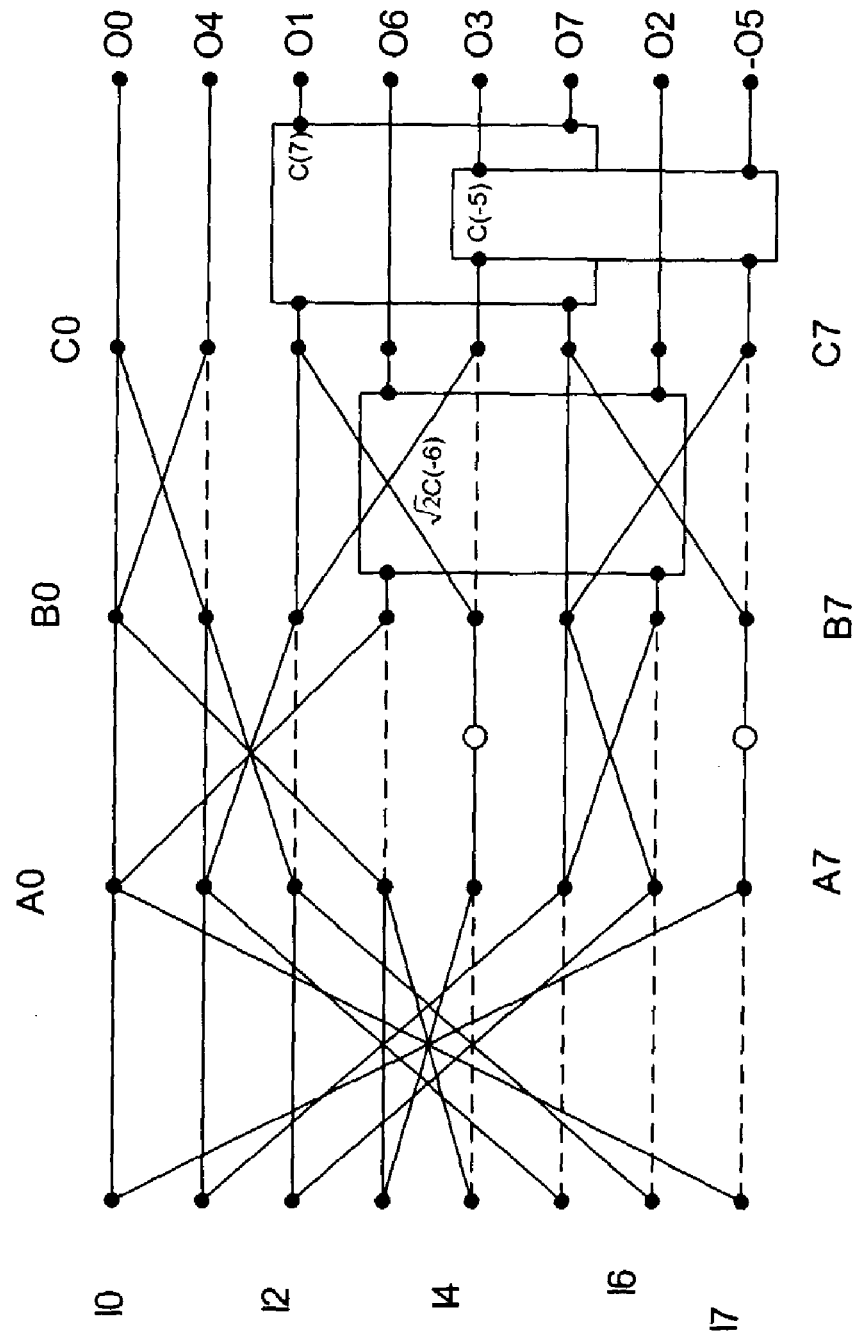

The first type CT and ICT are made of various "building blocks", but it is noted that various calculations are omitted from these "building blocks", such as calculations that cancel each other and calculations that are not required for the provision of a final result. FIGS. 2a and 2b illustrate a first type ICT and CT for an offset of a single pixel, whereas the "building blocks" are illustrated by the following equations. Preferred combinations of building blocks are provided at table 1. Those of skill in the art will appreciate how to combine the building block of table 1 for providing the first type CT and ICT, based upon the following description.

First Building Block $A0=I0+I7;\ A1=I1+I2;\ A2=I1-I2;\ A3=I3+I4;\ A4=I3-I4;\ A5=I5+I6;\ A6=I5-I6\ A7=I0-I7.$ $B0=A0+A3;\ B1=A1+A5;\ B2=A2+A6;\ B3=A0-A3;\ B4=\sqrt{2}*A4;\ B5=A1-A5;\ B6=A2-A6;\ B7=\sqrt{2}*A7.$ $C0=B0+B1;\ C1=B0-B1;\ C2=B2+B4;\ C3,\ C6=ROT(\sqrt{2}C-6)[B3,\ B6];\ C4=B2-B4;\ C5=B5+B7;\ C7=B5-B7;$ $O0=C0,\ O4=C1,\ O1,\ O7=ROT(C2)[C1,\ C5];\ O6=C3;\ O3,-O5=ROT(C-5)[C4,\ C7],\ O2=C6.$ Second Building Block $A0=I0+I7;\ A1=I1+I5;\ A2=I2+I6;\ A3=I3+I4;\ A4=I3-I4;\ A5=I1-I5;\ A6=I2-I6;\ A7=I0-I7.$ $B0=A0+A3;\ B1=A1+A2;\ B2=A1-A2;\ B3=A0-A3;\ B4=\sqrt{2}*A4;\ B5=A5+A6;\ B6=A5-A6;\ B7=\sqrt{2}*A7;$ $C0=B0+B1;\ C1=B0-B1;\ C2=B2+B4;\ C3,\ C6=ROT(\sqrt{2}C-6)[B3,\ B6];\ C4=B2-B4;\ C5=B5+B7;\ C7=B5-B7;$ $O0=C0;\ O4=C1,\ O1,\ O7=ROT(C2)[C1,\ C5];\ O6=C3;\ O3,-O5=ROT(C-5)[C4,\ C7],\ O2=C6.$ Third Building Block $A0=I0+I3;\ A1=I1+I6;\ A2=I2+I5;\ A3=I0-I3;\ A4=I4+I7;\ A5=I2-I5;\ A6=I1-I6;\ A7=I4-I7.$ $B0=A0+A4;\ B1=A1+A2;\ B2=A1-A2;\ B3=A3+A7;\ B4=A0-A4;\ B5=\sqrt{2}*A5;\ B6=\sqrt{2}*A6;\ B7=A3-A7;$ $C0=B0+B1;\ C1=B0-B1;\ C2,\ C7=ROT(\sqrt{2}C6)[B2,\ B7];\ C3=B3+B5;\ C4=B6+B4;\ C5=B3-B5;\ C6=B4-B6.$ $O0=C0;\ O4=C1;\ O2=C2;\ O1,-O7=ROT(C5)[C3,\ C4];\ O3,\ O5=ROT(C1)[C5,\ C6];\ O6=C7.$ Fourth Building Block $A0=I0+I4;\ A1=I1+I6;\ A2=I2+I5;\ A3=I7+I3;\ A4=I0-I4;\ A5=I2-I5;\ A6=I1-I6;\ A7=I3-I7.$ $B0=A0+A3;\ B1=A1+A2;\ B2=A1-A2;\ B3=A0-A3;\ B4=A4+A7;\ B5=\sqrt{2}*A5;\ B6=\sqrt{2}*A6;\ B7=A4-A7;$ $C0=B0+B1;\ C1=B0-B1;\ C2,\ C7=ROT(\sqrt{2}C6)[B2,\ B7];\ C3=B3+B5;\ C4=B6+B4;\ C5=B3-B5;\ C6=B4-B6.$ $O0=C0;\ O4=C1;\ O2=C2;\ O1,-O7=ROT(C5)[C3,\ C4];\ O3,\ O5=ROT(C1)[C5,\ C6];\ O6=C7.$ Fifth Building Block $A0=I0+I7$; $A1=I1+I6$; $A2=I2+I5$; $A3=I3+I4$; $A4=I3-I4$; $A5=I2-I5$; $A6=I1-I6$;

$A7=I0-I7$.

$B0=A0+A3$; $B1=A1+A2$; $B2=A1-A2$; $B3=A0-B3$; $B4,B7=ROT(C3)[A4,A7]$; $B5, B6=ROT(C3)[A5, A7]$;

$C0=B0+B1$; $C1=B0-B1$; $C2,C3=ROT(\sqrt{2}C1)[B2,B3]$; $C4=B4+B6$; $C5=B7-B5$; $C6=B4-B6$; $C7=B5+B7$;

$O0=C0$; $O1=C7+C4$; $O2=C2$; $O3=\sqrt{2}C5$; $O4=C1$; $O5=\sqrt{2}C6$; $O6=C3$; $O7=C7-C4$

TABLE 1

| Pixel offset Δ | ICT-Applied on first matrix (overlaps Δ) | ICT-Applied on second matrix (overlaps 8−Δ) | CT |
|---|---|---|---|
| 1 | Fourth/Second building blocks | Each building block, including other building blocks described by Loeffer | Fourth/Second building blocks |
| 2 | First/Third building blocks | Fifth building blocks | First/Third building blocks |
| 3 | Fourth building block | Each building blocks, including other building blocks described by Loeffer | Fourth building block |
| 4 | First/Third building blocks | First/Third building blocks | First/Third building blocks |
| 5 | Each building blocks, including other building blocks described by Loeffer | Fourth building block | Fourth building block |
| 6 | Each building blocks, including other building blocks described by Loeffer | First/Third building blocks | First/Third building blocks |
| 7 | Each building blocks, including other building blocks described by Loeffer | Fourth/Second building blocks | Fourth/Second building blocks |

First Type ICT and CT for an Offset of One Pixel.

FIGS. 2a and 2b illustrate a first type ICT and a first type CT, in accordance to an aspect of the invention.

The following example illustrates a first type row wise ICT and CT, although the same applies to first type column wise CT and ICT.

Addition operation, subtraction operation and ROT operations are graphically illustrated by the following signs:

Addition of a first variable with a second variable: a straight line extending from the first variable that is connected by a dot to another straight line extending from the second variable.

Subtraction of a first variable from a second variable: a dashed line extending from the first variable that is connected by a dot to another straight line extending from the second variable.

Rotation operation (ROT) is denoted by a rectangle having two inputs and two outputs. A multiplication by $\sqrt{2}$ is denoted by "0", a multiplication by 2 is denoted by "<<" and a multiplication by $2*\sqrt{2}$ is denoted by "0<<".

FIG. 2a illustrated the ICT operation. The upper portion of FIG. 2a illustrated a portion of the ICT that is applied on the upper matrix (in the case of a row wise ICT). It is also defined by the following set of equations:

$A0=I0$; $A1$, $A7=ROT(C-5)[I1,-I7]$; $A2=I2$; $A3$, $A5=ROT(C-1)[I3,I5]$, $A4=I4$ and $A6=I6$.

$B0=A0$; $B1=A1+A3$; $B2, B6=ROT(\sqrt{2}C-6)[A2, A6]$; $B3=A1-A3$; $B4=A0-A4$; $B5=A7-A5$; $B7=A7+A5$.

$C0=B0$; $C2=B4-B2$; $C3=\sqrt{2}B3$; $C4=B4+B2$; $C5=\sqrt{2}*B5$; $C6=B7-B6$; $C7=B7+B6$.

$IR0=C5+C4$; $IR1=C2+C3$; $IR2=C1+C6$; $IR3=C0-C7$; $IR4=C2-C3$; $IR5=C4-C5$; $IR6=C1-C6$.

The lower portion of FIG. 2a illustrated a portion of the ICT that is applied on the lower matrix (in the case of a row wise ICT). It is also defined by the following set of equations:

$A0=I0$; $A2=I2$; $A4=I4$; $A5=LOW\_ROT(\sqrt{2}C5)[I3,-I5]$; $A6=I6$; $A7=LOW\_ROT(\sqrt{2}C-7)[I1, I7]$.

$B0=A0+A4$; $B5=A7-A5$; $B6=UP\_ROT(\sqrt{2}C6)[A6, A2]$;

$C0=B0+B6$; $C5=B5$ $IR7=C0+C5$.

FIG. 2b illustrates a CT that is applied on a matrix. It is also defined by the following set of equations:

$A0=I0+I5$; $A1=I2+I1$; $A2=I1-I2$; $A3=I6-I3$; $A4=I7+I4$; $A5=I0-I5$; $A6=I3+I6$; $A7=I4-I7$;

$B0=A0+A6$; $B1=A4-A1$; $B2=A7-A2$; $B3=\sqrt{2}A3$; $B4=A1+A4$; $B5=\sqrt{2}*A5$;

$B6=A0-A6$; $B7=A2+A7$;

$C0=B0+B4$; $C1=B1+B3$; $C6, C2=ROT(\sqrt{2}C-6)[B6, B2]$; $C3=B1-B3$; $C4=B0-B4$; $C5=B7-B5$; $C7=B5+B7$;

$O0=C0$; $O1, O7=ROT(C7)[C1, C7)$; $O2=C2$; $O3,-O5=ROT(C-5)[C3, C5]$, $O4=C4$; $O6=C6$.

Second Type ICT and CT for an Offset of One Pixel.

Figure 3A:
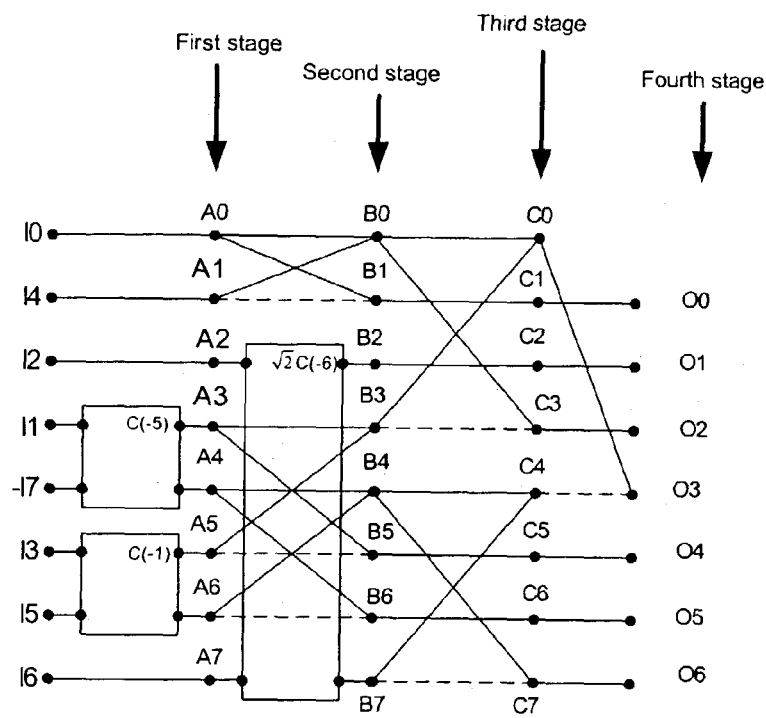
FIGS. 3a and 3b illustrate a second type ICT and a second type CT to be applied when an offset of one pixel is present, in accordance to an aspect of the invention.
Figure 3A:
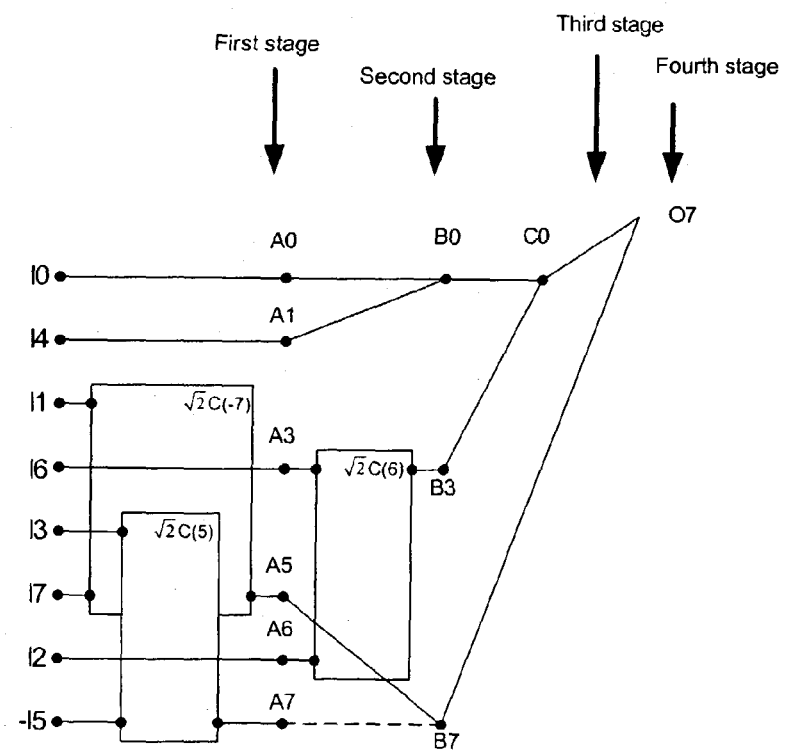

The upper portion of FIG. 3a illustrated a portion of the ICT that is applied on the upper matrix (in the case of a row wise ICT). It is also defined by the following set of equations:

$A0=I0$; $A1=I4$; $A2=I2$; $A3$, $A4=ROT(C-5)[I1,-I7]$; $A5,A6=ROT(C-1)[I3, I5]$ and $A7=I6$.

$B0=A0+A1$; $B1=A0-A1$; $B2, B7=ROT((\sqrt{2}C-6)[A2, A7]$; $B3=A5+A3$; $B4=A4+A6$; $B5=A3-A5$; $B6=A4-A6$.

$C0=B0+B3$; $C1=B1$; $C2=B2$; $C3=B0-B3$; $C4=B4+B7$; $C5=B5$; $C6=B6$ and $C7=B4-B7$.

$O0=C1$; $O1=C2$; $O=C3$; $O3=C0-C4$; $O4=C5$, $O5=C6$, and $O6=C7$.

The lower portion of FIG. 3a illustrated a portion of the ICT that is applied on the lower matrix (in the case of a row wise ICT). It is also defined by the following set of equations:

$A0=I0$; $A1=I4$; $A5=LOW\_ROT(\sqrt{2}C-7)[I1, I7]$; $A3=I6$; $A6=I2$; $A7=LOW\_ROT(\sqrt{2}C5)[I3,-I5]$.

$B0=A0+A1$; $B3$=HIGH-ROT($\sqrt{2}C6$)[$A3$, $A6$]; $B7=A5-A7$;

$C0=B0+B3$; $C7=B7$.

$O7=C0+C7$.

Figure 3B:
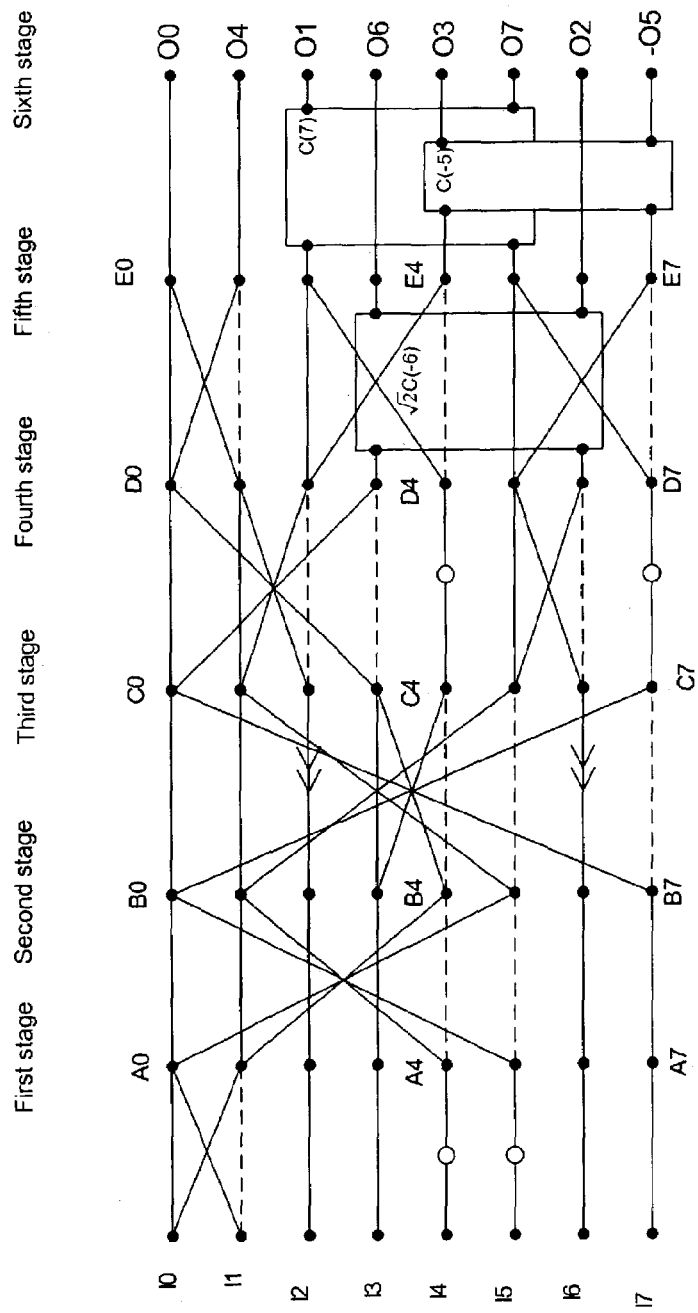

FIG. 3b illustrates a CT that is applied on a matrix. It is also defined by the following set of equations:

$A0=I0+I1$; $A1=I0-I1$; $A2=I2$; $A3=I3$; $A4=\sqrt{2}*I4$; $A5=\sqrt{2}*I5$; $A6=I6$; $A7=I7$.

$B0=A0+A5$; $B1=A1+A4$; $B2=A2$; $B3=A3$; $B4=A1-A4$; $B5=A0-A5$; $B6=A6$; $B7=A7$.

$C0=B0+B7$; $C1=B1+B5$; $C2=2*B2$; $C3=B3+B4$; $C4=B3-B4$; $C5=B1-B5$; $C6=2*B6$; $C7=B0-B7$.

$D0=C0+C3$; $D1=C1+C2$; $D2=C1-C2$; $D3=C0-C3$; $D4=\sqrt{2}*C4$; $D5=C5+C6$; $D6=C5-C6$; $D7=\sqrt{2}*C7$.

$E0=D0+D1$; $E1=D0-D1$; $E2=D2+D4$; $E3, E6=ROT(\sqrt{2}E-6)[D3, D6]$; $E4=D2-D4$; $E5=D5+D7$; $E7=D5-D7$;

$O0=E0$; $O4=E1$; $O1, O7=ROT(C7)[E2, E5]$); $O6=E3$; $O3, -O5=ROT(C-5)[E4, E7]$; $O2=E6$.

Second Type ICT and CT for an Offset of Two Pixels.

Figure 4A:
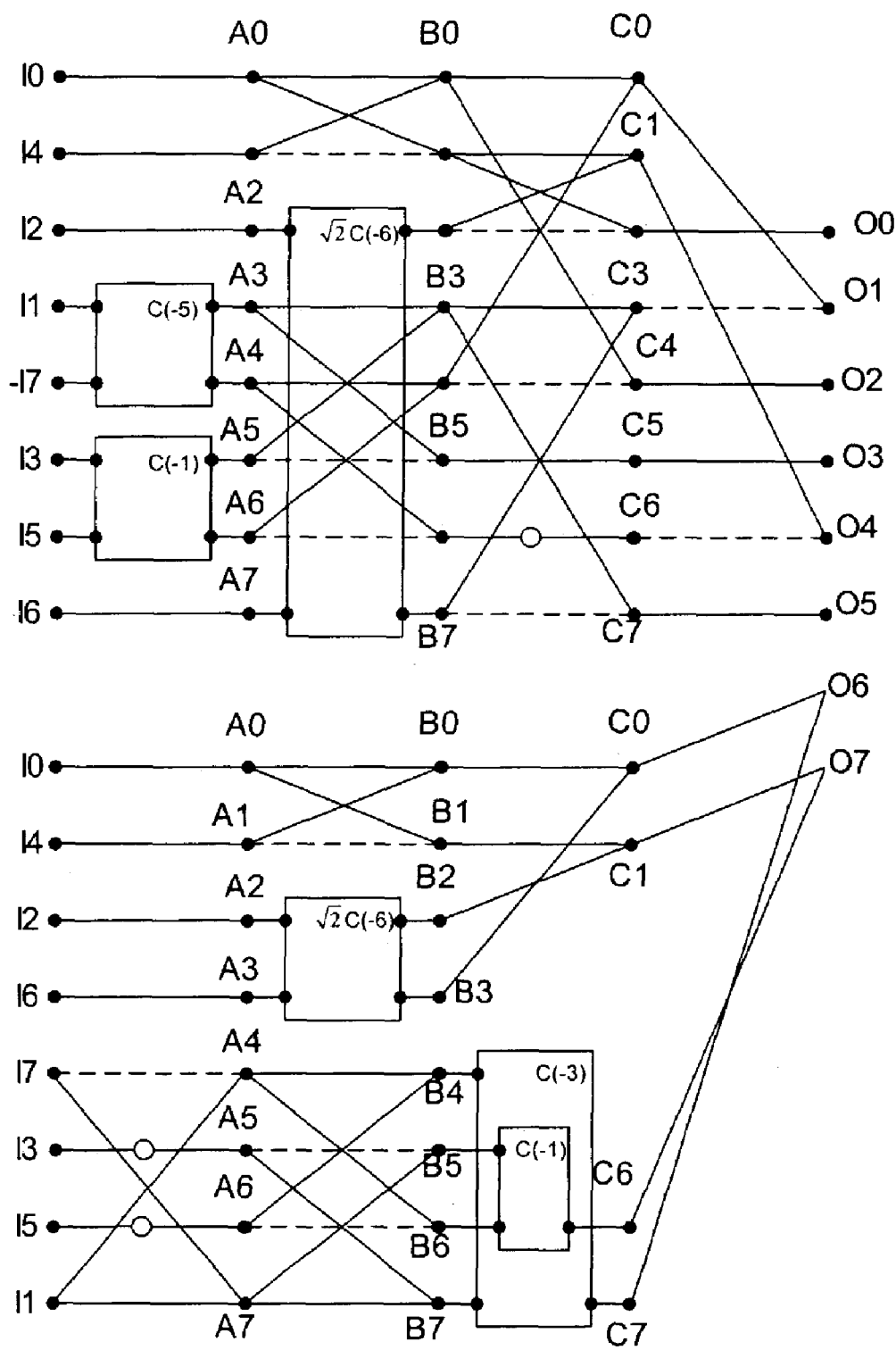
FIGS. 4a and 4b illustrate a second type ICT and a second type CT to be applied when an offset of two pixels is present, in accordance to an aspect of the invention.

The upper portion of FIG. 4a illustrated a portion of the ICT that is applied on the upper matrix (in the case of a row wise ICT). It is also defined by the following set of equations:

$A0=I0$; $A1=I4$; $A2=I2$; $A3, A4=ROT(C-5)[I1,-I7]$; $A5,A6=ROT(C-1)[I3, I5]$, $A7=I6$.

$B0=A0+A1$; $B1=A0-A1$; $B2, B7=ROT((\sqrt{2}C-6)[A2, A7]$; $B3=A5+A3$; $B4=A4+A6$; $B5=A3-A5$; $B6=A4-A6$.

$C0=B0+B4$; $C1=B1+B2$; $C2=B1-B2$; $C3=B3+B7$; $C4=B0-B4$; $C5=B5$; $C6=\sqrt{2}B6$ and $C7=B3-B7$.

$O0=C2$; $O1=C0-C3$; $O2=C4$; $O3=C5$; $O4=C1-C6$ and $O5=C7$.

The lower portion of FIG. 4a illustrated a portion of the ICT that is applied on the lower matrix (in the case of a row wise ICT). It is also defined by the following set of equations:

$A0=I0$; $A1=I4$; $A2=I2$; $A3=I6$; $A4=I1-I7$; $A5=\sqrt{2}*I3$; $A6=\sqrt{2}*I5$; $A7=I7+I1$.

$B0=A0+A1$; $B1=A0-A1$; $B2, B3=ROT(\sqrt{2}C-6)[A2,A3]$; $B4=A4+A6$; $B5=A7-A5$; $B6=A4-A6$; $B7=A5+A7$.

$C0=B0+B3$; $C1=B1+B2$; $C6=$LOW_ROT($C-1$)[$B5, B6$], $C7=$LOW_ROT($C-3$)[$B4, B7$].

$O6=C0+C7$; $O7=C1+C6$.

Figure 4B:
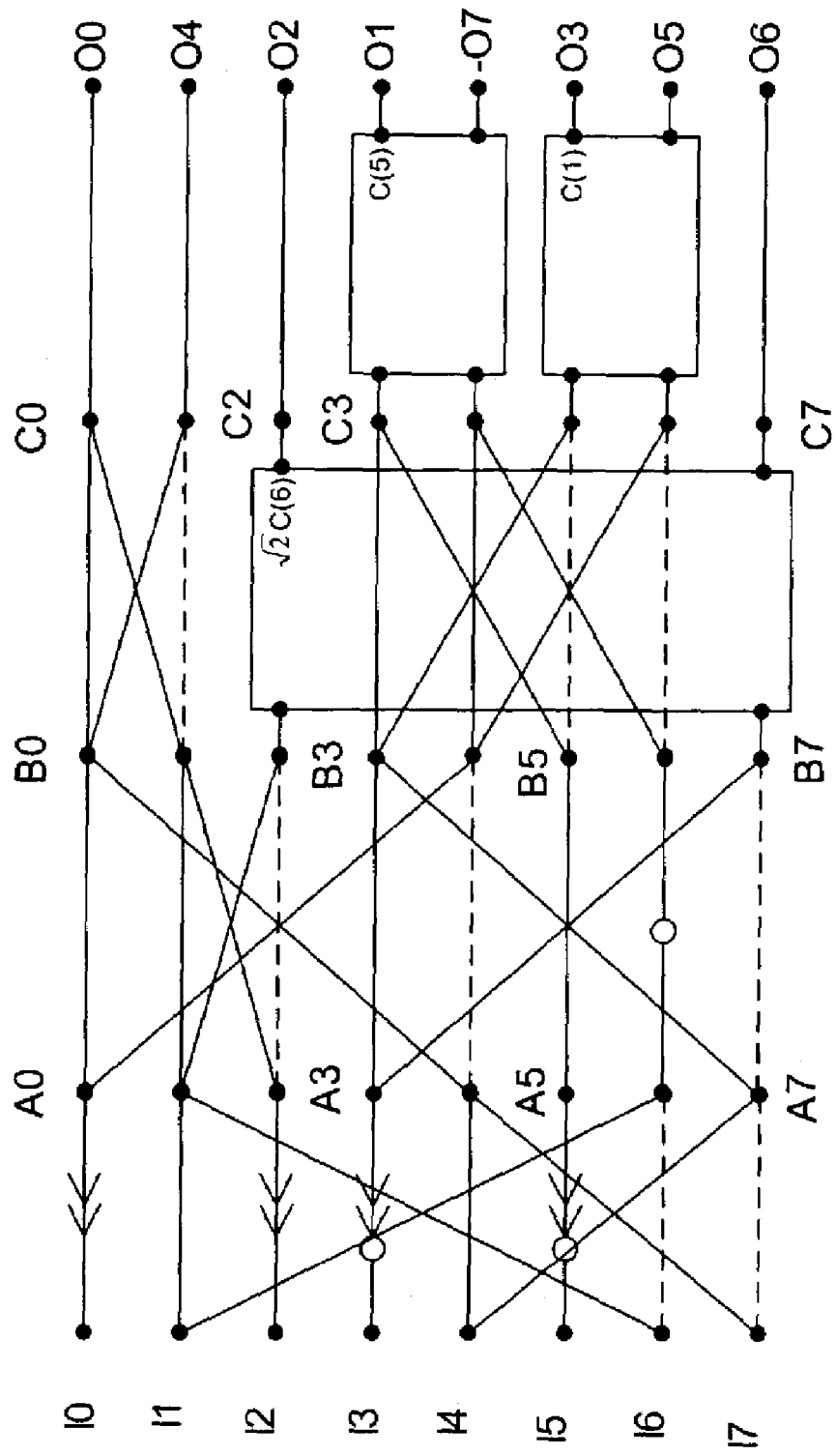

FIG. 4b illustrates a CT that is applied on a matrix. It is also defined by the following set of equations:

$A0=2*I0$; $A1=I1$; $A2=2*I2$; $A3=2\sqrt{2}*I3$; $A4=I4+I7$; $A5=2\sqrt{2}*I5$; $A6=I1-I6$; $A7=I4-I7$.

$B0=A0+A4$; $B1=A1+A2$; $B2=A1-A2$; $B3=A3+A7$; $B4=A0-A4$; $B5=A5$; $B6=\sqrt{2}*A6$; $B7=A3-A7$.

$C0=B0+B1$; $C1=B0-B1$; $C2, C7=ROT(\sqrt{2}C6)[B2, B7]$; $C3=B5+B3$; $C4=B4+B6$; $C5=B3-B5$; $C6=B4-B6$.

$O0=C0$; $O4=C1$; $O2=C2$; $O1,-O7=ROT(C5)[C3, C4]$; $O3, O5=ROT(C1)[C5, C6]$; $O6=C7$.

Second Type ICT and CT for an Offset of Three Pixels

Figure 5A:
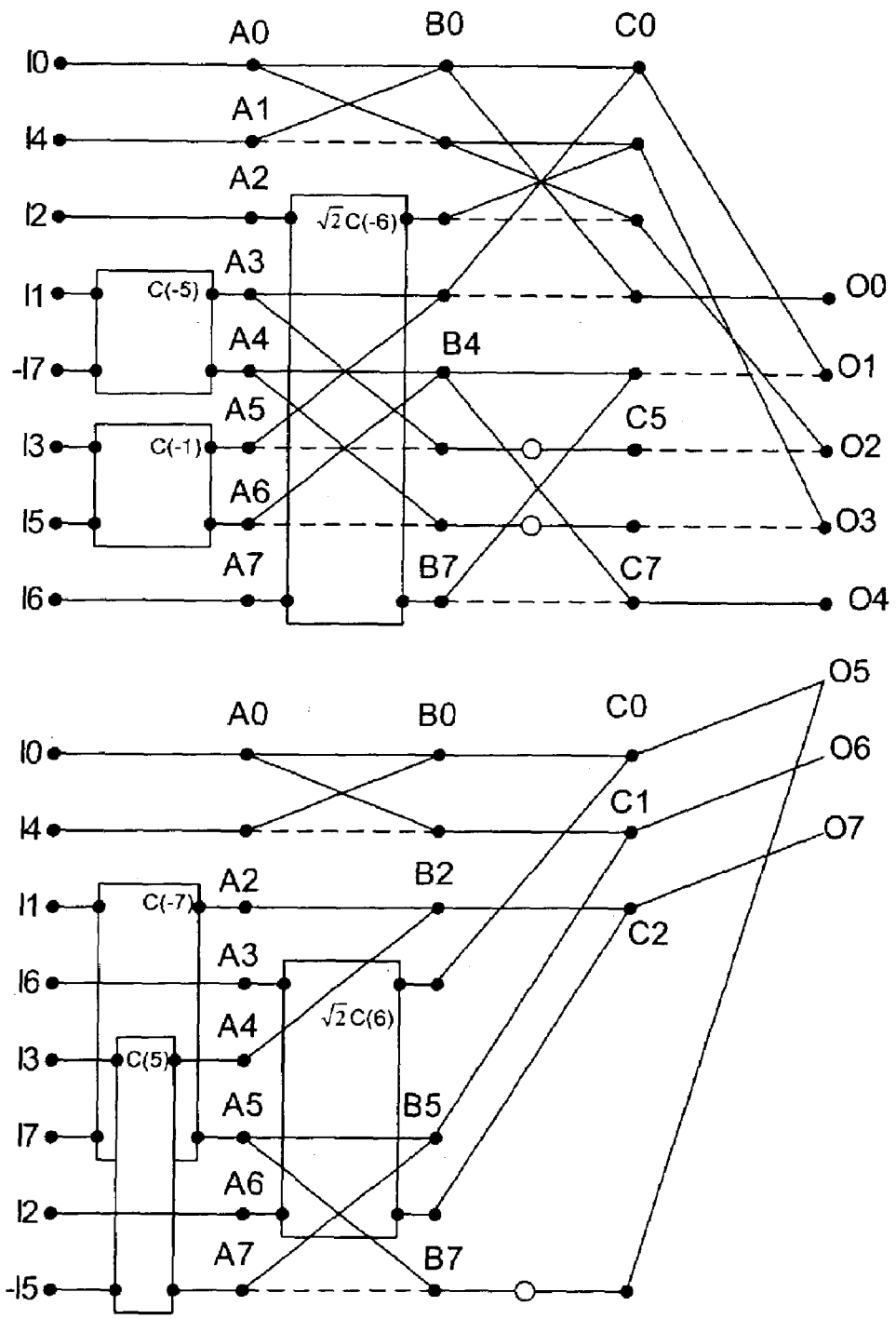
FIGS. 5a and 5b illustrate a second type ICT and a second type CT to be applied when an offset of three pixels is present, in accordance to an aspect of the invention.

The upper portion of FIG. 5a illustrated a portion of the ICT that is applied on the upper matrix (in the case of a row wise ICT). It is also defined by the following set of equations:

$A0=I0$; $A1=I4$; $A2=I2$; $A3, A4=ROT(C-5)[I1,-I7]$; $A5,A6=ROT(C-1)[I3, I5]$ and $A7=I6$.

$B0=A0+A1$; $B1=A0-A1$; $B2, B7=ROT((\sqrt{2}C-6)[A2, A7]$; $B3=A5+A3$; $B4=A4+A6$; $B5=A3-A5$; $B6=A4-A6$.

$C0=B0+B3$; $C1=B1+B2$; $C2=B1-B2$; $C3=B0-B3$; $C4=B4+B7$; $C5=\sqrt{2}*B5$; $C6=\sqrt{2}*B6$ and $C7=B4-B7$.

$O0=C3$; $O1=C0-C4$; $O2=C2-C5$; $O3=C1-C6$; $O4=C7$.

The lower portion of FIG. 5a illustrated a portion of the ICT that is applied on the lower matrix (in the case of a row wise ICT). It is also defined by the following set of equations:

$A0=I0$; $A1=I4$; $A2, A5=ROT(C-7)[I1, I7]$; $A3=I6$; $A4, A7=ROT(C5)[I3,-I5]$; $A6=I2$.

$B0=A0+A1$; $B1=A0-A1$; $B2=A2+A4$; $B3, B6=ROT(\sqrt{2}C6)[A3,A6]$; $B5=A5+A7$; $B7=A5-A7$.

$C0=B0+B3$; $C1=B1+B5$; $C2=B2+B6$; $C7=\sqrt{2}*B7$.

$O5=C0+C7$; $O6=C1$; $O7=C2$.

Figure 5B:
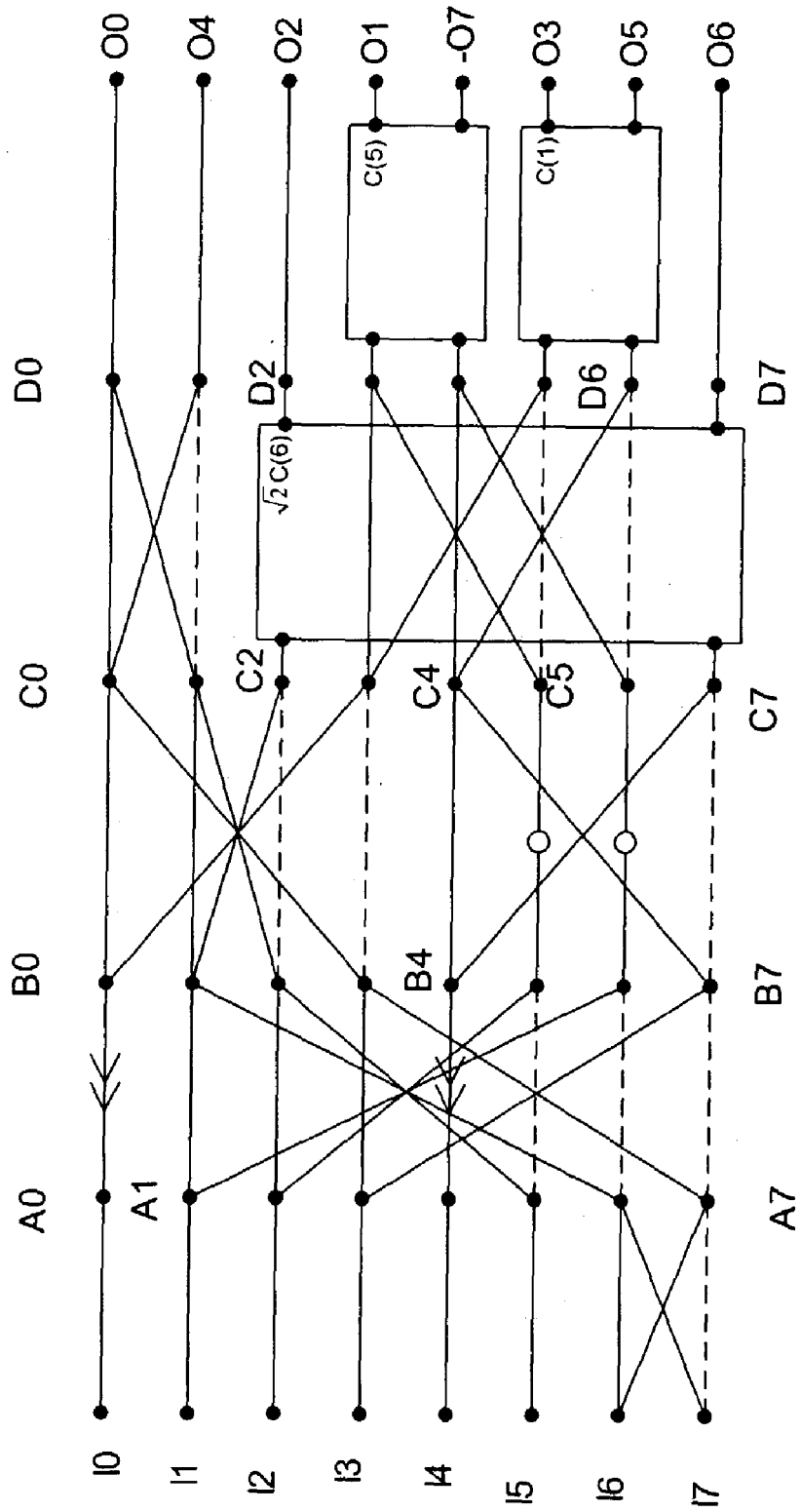

FIG. 5b illustrates a CT that is applied on a matrix. It is also defined by the following set of equations:

$A0=I0$; $A1=I1$; $A2=I2$; $A3=I3$; $A4=I4$; $A5=I5$; $A6=I6+I7$; $A7=I6-I7$.

$B0=2*A0$; $B1=A1+A6$; $B2=A5+A2$; $B3=A3+A7$; $B4=2*A4$; $B5=A2-A5$; $B6=A1-A6$; $B7=A3-A7$.

$C0=B0+B3$; $C1=B1+B2$; $C2=B1-B2$; $C3=B0-B3$; $C4=B4+B7$; $C5=\sqrt{2}*B5$; $C6=2*B6$; $C7=B4-B7$.

$D0=C0+C1$; $D1=C0-C1$; $D2, D7=ROT(\sqrt{2}C6)[C2, C7]$; $D3=C3+C5$; $D4=C4+C6$; $D5=C3-C5$; $D6=C4-C6$.

$O0=D0$; $O4=D1$; $O2=D2$; $O1,-O7=ROT(C5)[D3, D4]$; $O3, O5=ROT(C1)[D5, D6]$; $O6=D7$.

Second Type ICT and CT for an Offset of Four Pixels.

Figure 6A:
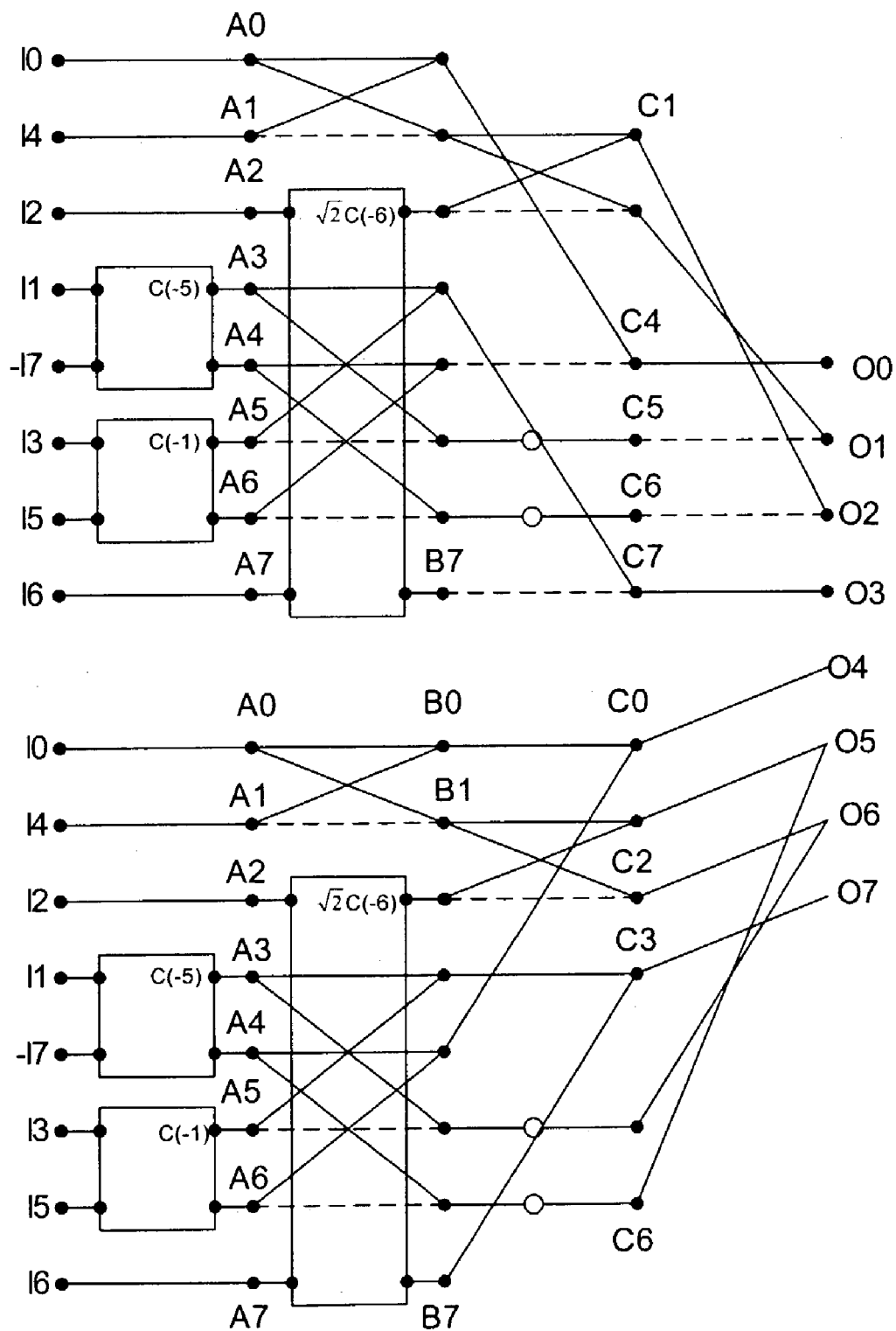
FIGS. 6a and 6b illustrate a second type ICT and a second type CT to be applied when an offset of four pixels is present, in accordance to an aspect of the invention.

The upper portion of FIG. 6a illustrated a portion of the ICT that is applied on the upper matrix (in the case of a row wise ICT). It is also defined by the following set of equations:

$A0=I0$; $A2=I2$; $A2=I2$; $A3, A4=ROT(C-5)[I1,-I7]$; $A5,A6=ROT(C-1)[I3, I5]$ and $A7=I6$.

$B0=A0+A1$; $B1=A0-A1$; $B2, B7=ROT(\sqrt{2}C-6)[A2, A7]$; $B3=A3+A5$; $B4=A4+A6$; $B5=A3-A5$; $B6=A4-A6$.

$C1=B1+B2$; $C2=B1-B1$; $C4=B0-B4$; $C5=\sqrt{2}*B5$; $C6=\sqrt{2}*B6$; $C7=B3-B7$.

$O0=C4$; $O1=C2-C5$; $O2=C1-C6$; $O3=C7$.

The lower portion of FIG. 6a illustrated a portion of the ICT that is applied on the lower matrix (in the case of a row wise ICT). It is also defined by the following set of equations:

$$A0=I0; A1=I4; A2=I2; A3, A4=ROT(C-5)[I1,-I7];$$
$$A5,A6=ROT(C-1)[I3, I5] \text{ and } A7=I6.$$

$$B0=A0+A1; B1=A0-A1; B2, B7=ROT((\sqrt{2}C-6)[A2, A7]; B3=A5+A3; B4=A4+A6; B5=A3-A5; B6=A4-A6.$$

$$C0=B0+B4; C1=B1+B2; C2=B1-B2; C3=B3+B7; C5=\sqrt{2}*B5; C6=\sqrt{2}*B6.$$

$$O4=C0; O5=C1+C6; O6=C2+C5; O7=C3.$$

Figure 6B:
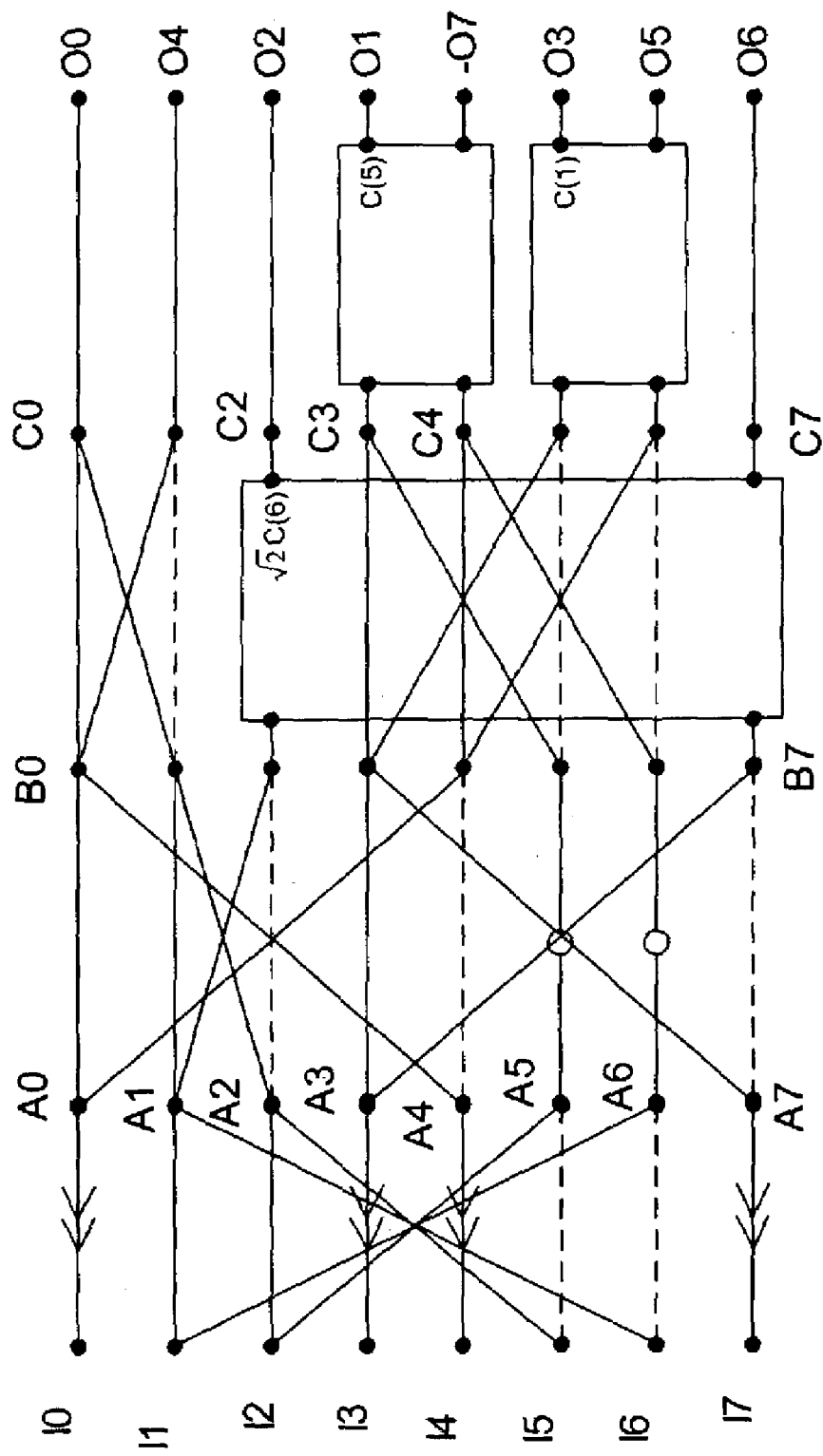

FIG. 6b illustrates a CT that is applied on a matrix. It is also defined by the following set of equations:

$$A0=2*I0; A1=I1+I6; A2=I2+I5; A3=2*I3; A4=2*I4; A5=I2-I5; A6=I1-I6; A7=2*I7.$$

$$B0=A0+A4; B1=A1+A2; B2=A1-A2; B3=A3+A7; B4=A0-A4; B5=\sqrt{2}*A5; B6=\sqrt{2}*A6; B7=A3-A7.$$

$$C0=B0+B1; C1=B0-B1; C2, C7=ROT(\sqrt{2}C6)[B2, B7]; C3=B3+B5; C4=B4+B6; C5=B3-B5; C6=B4-B6.$$

$$O0=C0; O4=C1; O2=C2; O1,-O7=ROT(C5)[C3, C4];$$

$$O3, O5=ROT(C1)[C5, C6]; O6=C7.$$

Second Type ICT and CT for an Offset of Five Pixels

Figure 7A:
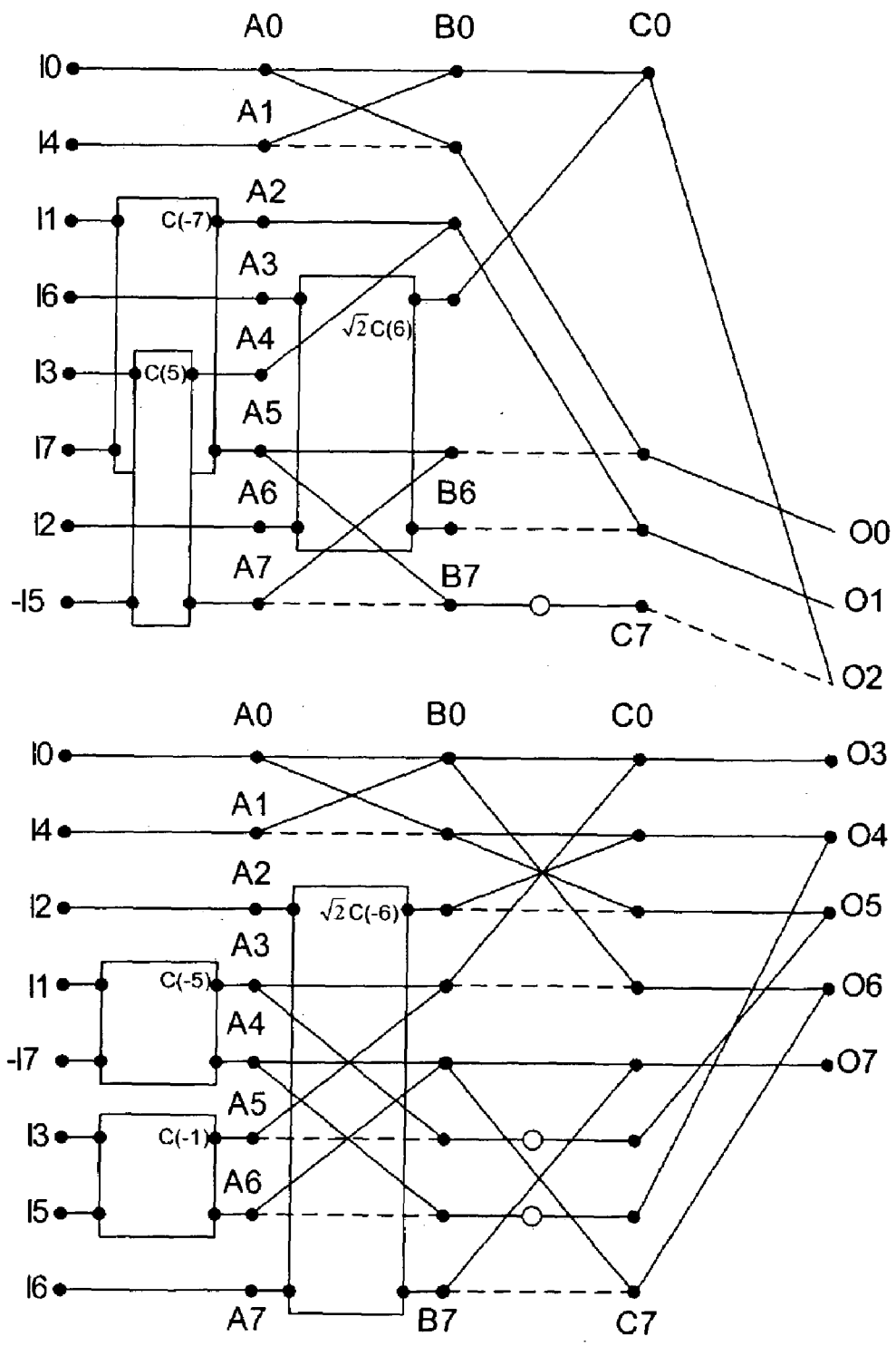
FIGS. 7a and 7b illustrate a second type ICT and a second type CT to be applied when an offset of five pixels is present, in accordance to an aspect of the invention.

The upper portion of FIG. 7a illustrated a portion of the ICT that is applied on the upper matrix (in the case of a row wise ICT). It is also defined by the following set of equations:

$$A0=I0; A1=I4; A2,A=ROT(C-7)[I1, I7]; A3=I6; A4,A7=ROT(C5)[I3,-I5] \text{ and } A6=I2.$$

$$B0=A0+A1; B1=A0-A1; B2=A2+A4; B3, B6=ROT((\sqrt{2}C-6)[A3, A6]; B5=A5+A7; B7=A5-A7.$$

$$C0=B0+B3; C5=B1-B5; C6=B2-B6; C7=\sqrt{2}*B7.$$

$$O0=C5; O1=C6; O2=C0-C7.$$

The lower portion of FIG. 7a illustrated a portion of the ICT that is applied on the lower matrix (in the case of a row wise ICT). It is also defined by the following set of equations:

$$A0=I0; A1=I4; A2=I2; A3, A4=ROT(C-5)[I1,-I7]; A5, A6=ROT(C-1)[I3, I5] \text{ and } A7=I6.$$

$$B0=A0+A1; B1=A0-A1; B2, B7=ROT((\sqrt{2}C-6)[A2, A7]; B3=A5+A3; B4=A4+A6; B5=A3-A5; B6=A4-A6.$$

$$C0=B0+B3; C1=B1+B2; C2=B1-B2; C3=B0-B3; C4=B4+B7; C5=\sqrt{2}*B5; C6=\sqrt{2}*B6 \text{ and } C7=B4-B7.$$

$$O3=C0; O4=C1+C6; O5=C2+C5; O6=C3+C7; O7=C4.$$

Figure 7B:
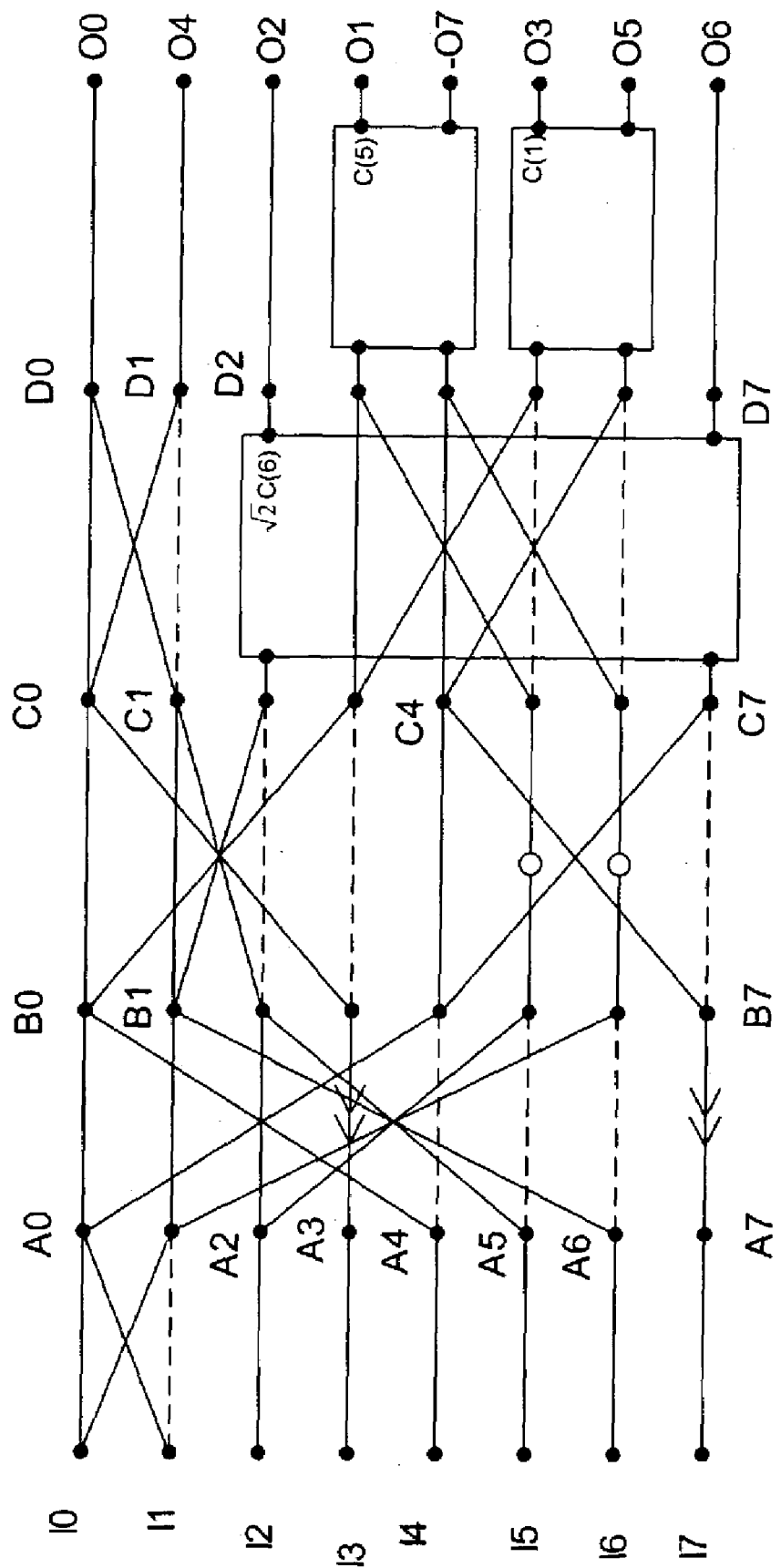

FIG. 7b illustrates a CT that is applied on a matrix. It is also defined by the following set of equations:

$$A0=I0+I1; A1=I0-I1; A2=I2; A3=I3; A4=I4; A5=I5; A6=I6; A7=I7.$$

$$B0=A0+A4; B1=A1+A6; B2=A5+A2; B3=2*A3; B4=A0-A4; B5=A2-A5; B6=A1-A6; B7=2*.$$

$$C0=B0+B3; C1=B1+B2; C2=B1-B2; C3=B0-B3; C4=B4+B7; C5=\sqrt{2}*B5; C6=\sqrt{2}*B6; C7=B4-B7.$$

$$D0=C0+C1; D1=C0-C1; D2, D7=ROT(\sqrt{2}C6)[C2, C7]; D3=C3+C5; D4=C4+C6; D5=C3-C5; D6=C4-C6.$$

$$O0=D0; O4=D1; O2=D2; O1,-O7=ROT(C5)[D3, D4]; O3, O5=ROT(C1)[D5, D6]; O6=D7.$$

Second Type ICT and CT for an Offset of Six Pixels.

Figure 8A:
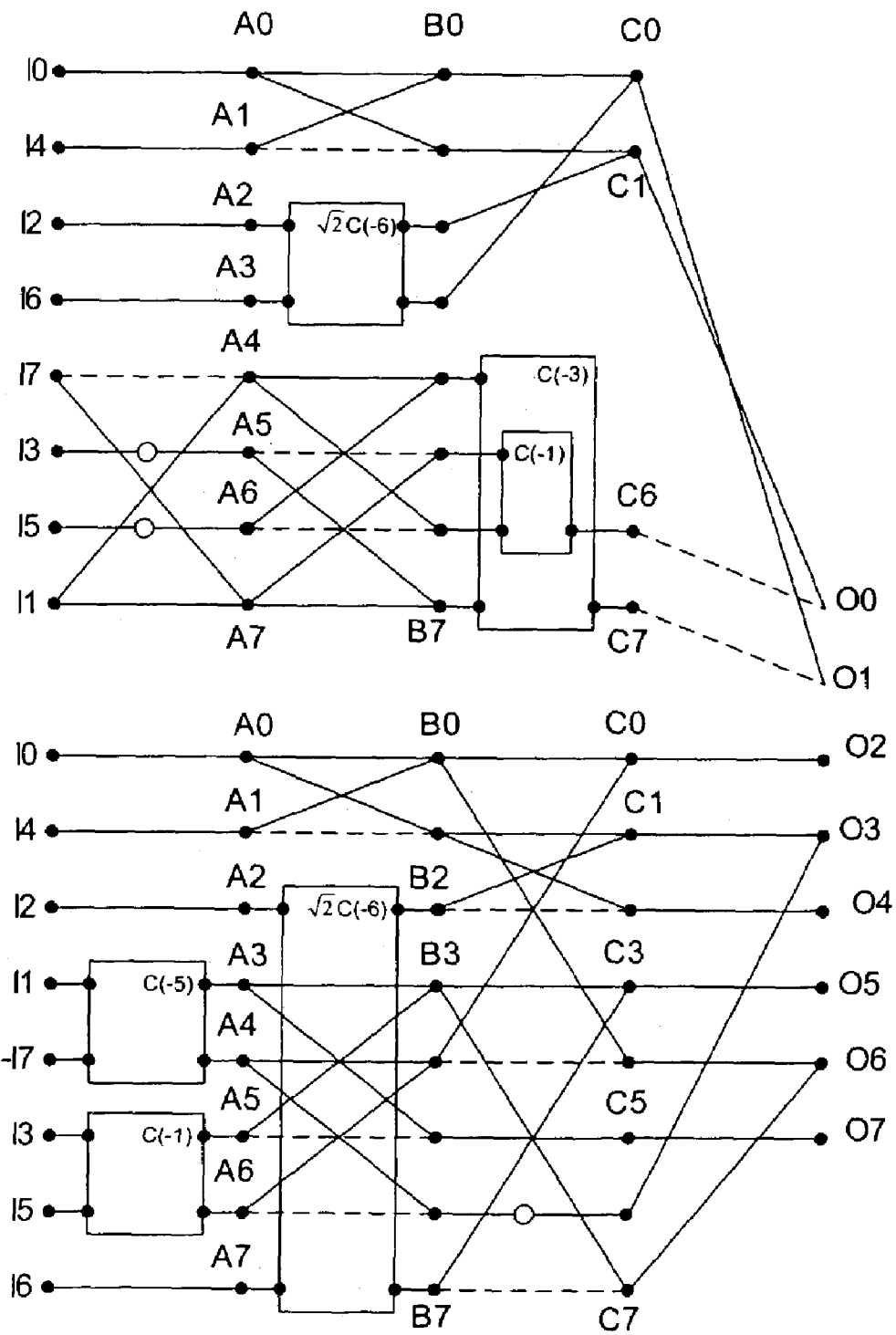
FIGS. 8a and 8b illustrate, a second type ICT to be applied when an offset of six pixels is present, in accordance to an aspect of the invention.

The upper portion of FIG. 8a illustrated a portion of the ICT that is applied on the upper matrix (in the case of a row wise ICT). It is also defined by the following set of equations:

$$A0=I0; A1=I4; A2=I2; A3=I6; A4=I1-I7; A5=\sqrt{2}*I3; A6=\sqrt{2}*I5; A7=I7+I1.$$

$$B0=A0+A1; B1=A0-A1; B2, B3=ROT(\sqrt{2}C-6)[A2,A3]; B4=A4+A6; B5=A7-A5; B6=A4-A6; B7=A5+A7.$$

$$C0=B0+B3; C1=B1+B2; C6=\text{LOW\_ROT}(C-1)[B5, B6]; C7=\text{LOW\_ROT}(C-3)[B4, B7].$$

$$O0=C1-C6; O1=C0-C7.$$

The lower portion of FIG. 8a illustrated a portion of the ICT that is applied on the lower matrix (in the case of a row wise ICT). It is also defined by the following set of equations:

$$A0=I0; A1=I4; A2=I2; A3, A4=ROT(C-5)[I1,-I7]; A5,A6=ROT(C-1)[I3, I5], A7=I6.$$

$$B0=A0+A1; B1=A0-A1; B2, B7=ROT((\sqrt{2}C-6)[A2, A7]; B3=A5+A3; B4=A4+A6; B5=A3-A5; B6=A4-A6.$$

$$C0=B0+B4; C1=B1+B2; C2=B1-B2; C3=B3+B7; C4=B0-B4; C5=B5; C6=\sqrt{2}*B6 \text{ and } C7=B3-B7.$$

$$O2=C0; O3=C1+C6; O4=C2; O5=C3; O6=C4+C7 \text{ and } O7=C5.$$

Figure 8B:
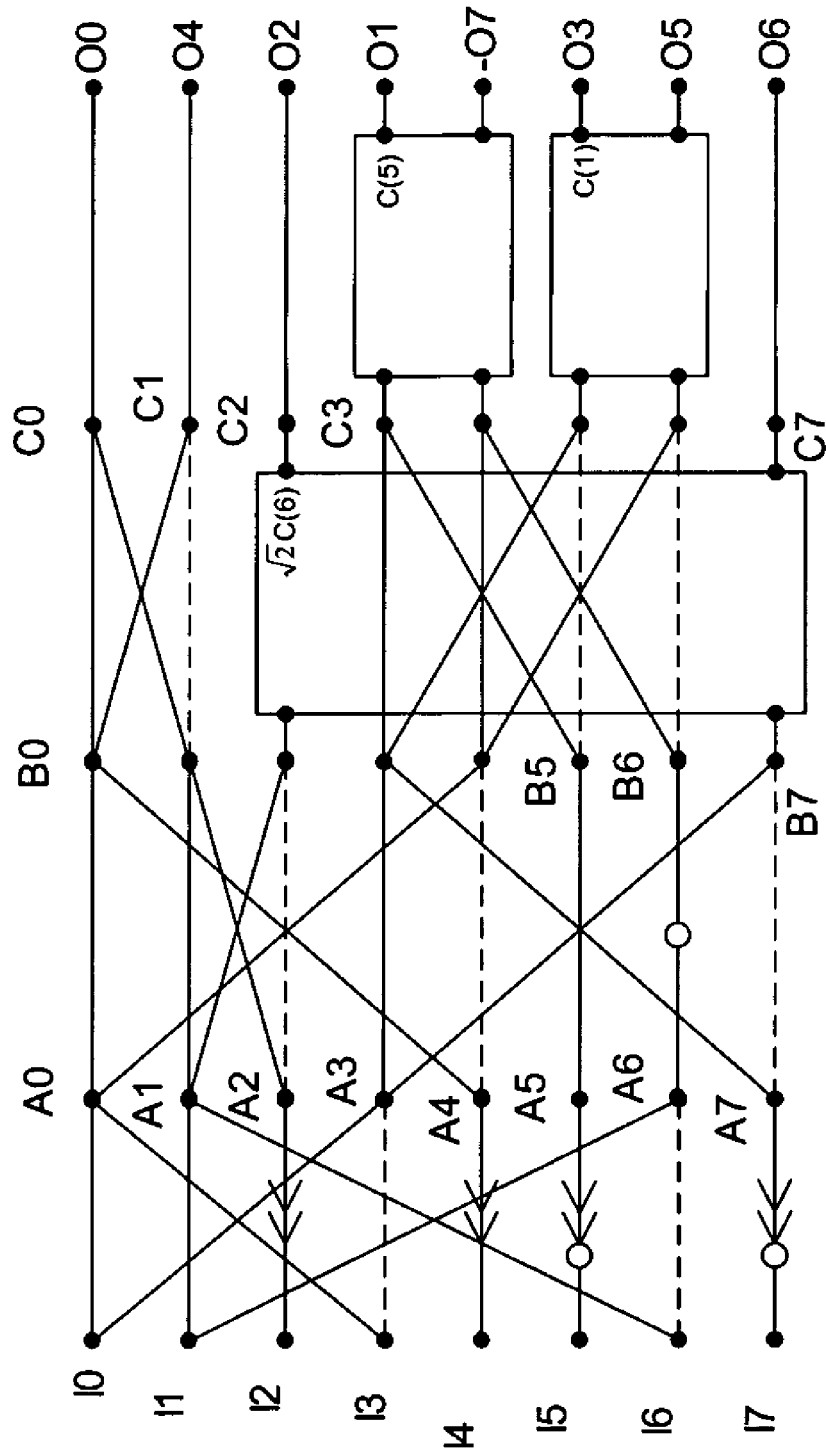

FIG. 8b illustrates a CT that is applied on a matrix is defined by the following set of equations:

$$A0=I3+I0; A1=I1+I6; A2=2*I2; A3=I0-I3; A4=2*I4; A5=2\sqrt{2}*I5; A6=I1-I6; A7=2\sqrt{2}*I7.$$

$$B0=A0+A4; B1=A1+A2; B2=A1-A2; B3=A3+A7; B4=A0-A4; B5=A5; B6=\sqrt{2}*A6; B7=A3-A7.$$

$$C0=B0+B1; C1=B0-B1; C2, C7=ROT(C6)[B2, B7]; C3=B5+B3; C4=B4+B6; C5=B3-B5; C6=B4-B6.$$

$$O0=C0; O4=C1; O2=C2; O1,-O7=ROT(C5)[C3, C4]; O3, O5=ROT(C1)[C5, C6]; O6=C7.$$

Second Type ICT and CT for an Offset of Seven Pixels.

Figure 9A:
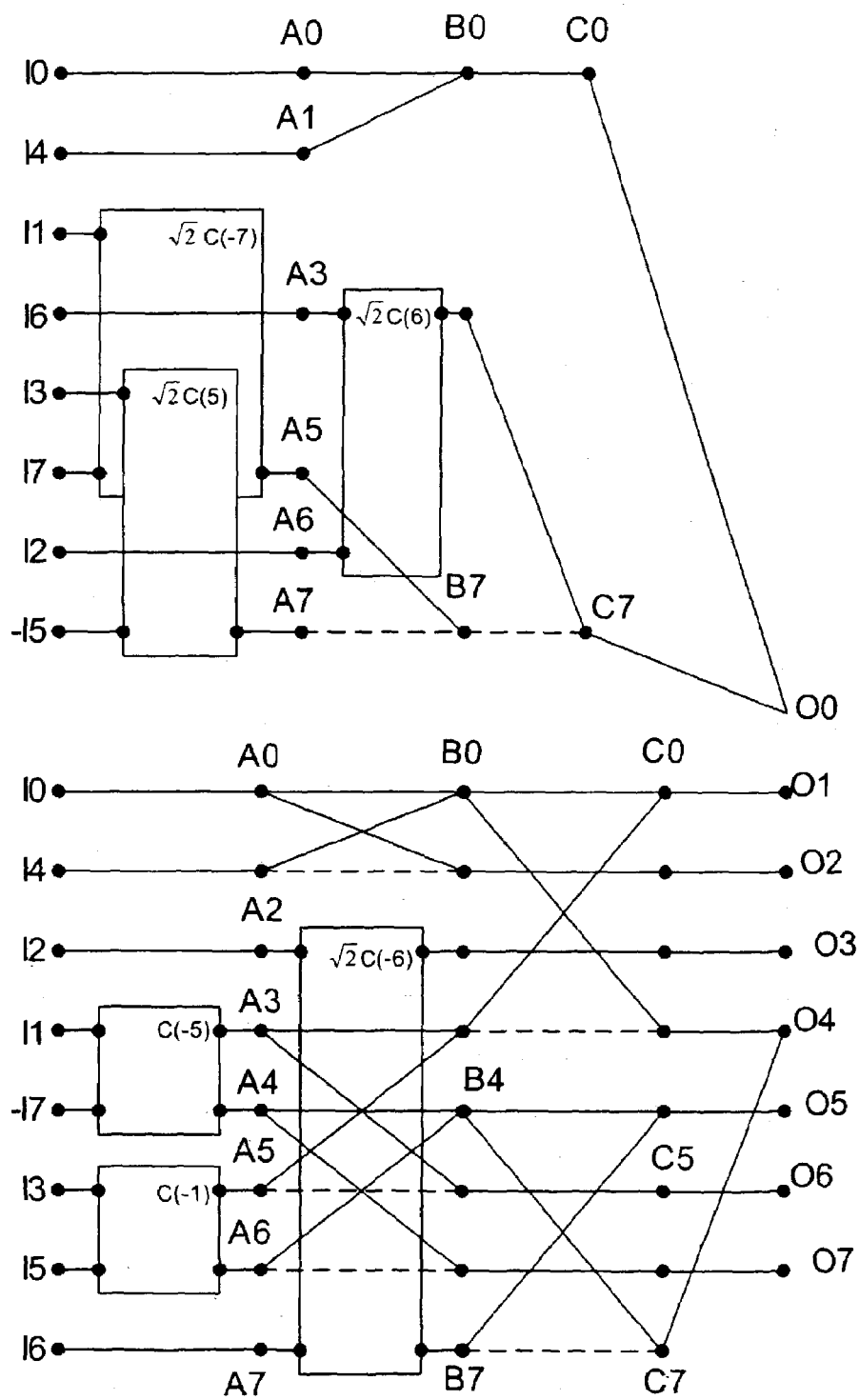
FIGS. 9a and 9b illustrate a second type ICT and a second type CT to be applied when an offset of seven pixels is present, in accordance to an aspect of the invention.

The upper portion of FIG. 9a illustrated a portion of the ICT that is applied on the upper matrix (in the case of a row wise ICT). It is also defined by the following set of equations:

$$A0=I0; A1=I4; A5\text{LOW\_ROT}(\sqrt{2}C-7)[I1, I7]; A3=I6; A6=I2; A7=\text{LOW\_ROT}(\sqrt{2}C5)[I3,-I5].$$

$$B0=A0+A1; B3=\text{HIGH\_ROT}(\sqrt{2}C6)[A3, A6]; B7=A5-A7;$$

$$C0=B0; C7=B3-B7;$$

$$O7=C0+C7.$$

The lower portion of FIG. 9a illustrated a portion of the ICT that is applied on the lower matrix (in the case of a row wise ICT). It is also defined by the following set of equations:

$$A0=I0;\ A1=I4;\ A2=I2;\ A3,\ A4=ROT(C-5)[I1,-I7];$$

$$A5,A6=ROT(C-1)[I3,I5]\text{ and }A7=I6.$$

$$B0=A0+A1;\ B1=A0-A1;\ B2,\ B7=ROT((\sqrt{2}C-6)[A2,A7];\ B3=A5+A3;\ B4=A4+A6;\ B5=A3-A5;\ B6=A4-A6.$$

$$C0=B0+B3;\ C1=B1;\ C2=^B2;\ C3=B0-B3;\ C4=B4+B7;\ C5=B5;\ C6=B6\text{ and }C7=B4-B7.$$

$$O1=C0;\ O2=C1;\ O3=C2;\ O4=C3+C7;\ O5=C4,\ O6=C5,\text{ and }O7=C6.$$

Figure 9B:
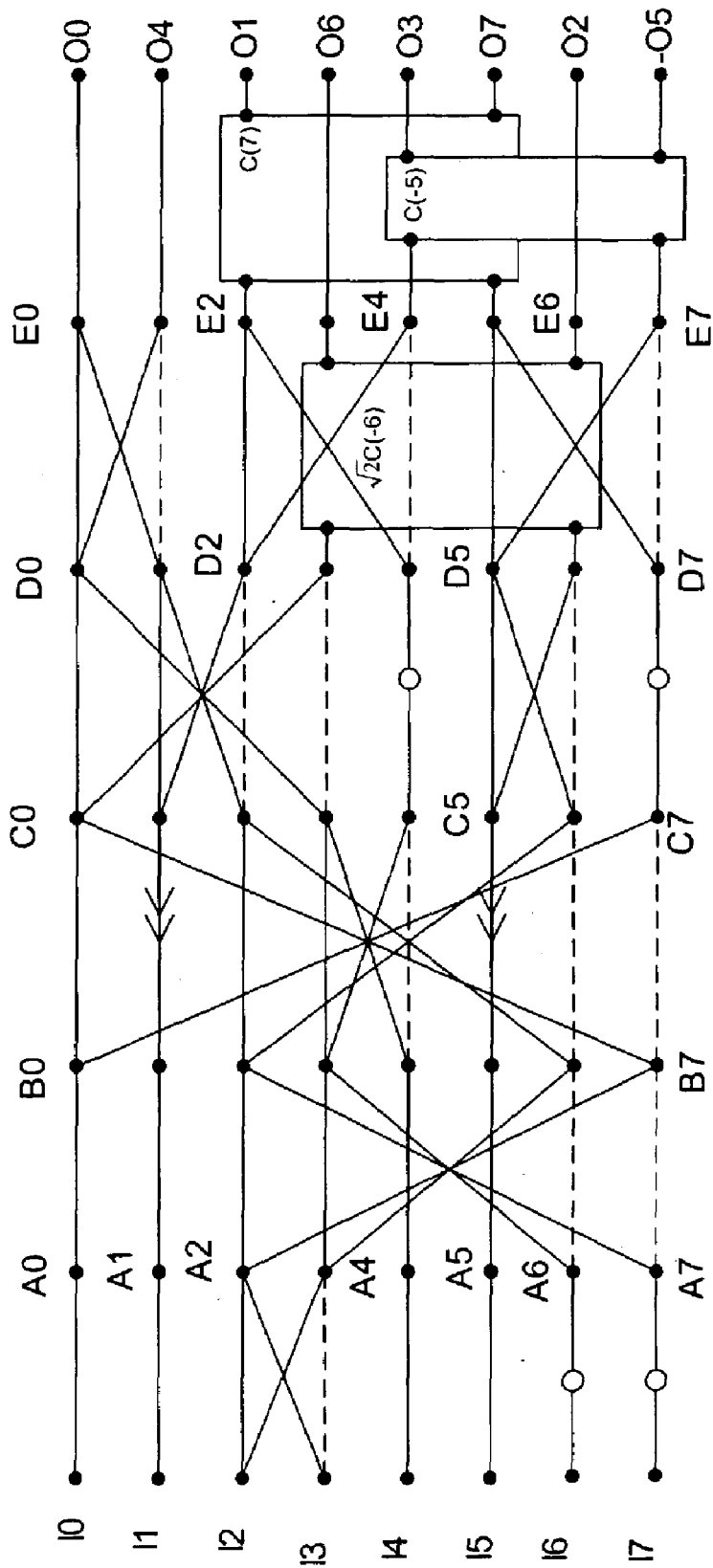

FIG. 9b illustrates a CT that is applied on a matrix. It is also defined by the following set of equations:

$$A0=I0;\ A1=I1;\ A2=I2+I3;\ A3=I2-I3;\ A4=I4;\ A5=I5;\ A6=\sqrt{2}*I6;\ A7=\sqrt{2}*I7.$$

$$B0=A0;\ B1=A1;\ B2=A2+A7;\ B3=A3+A6;\ B4=A4;\ B5=A5;\ B6=A3-A6;\ B7=A2-A7.$$

$$C0=B0+B7;\ C1=2*B1;\ C2=B6+B2;\ C3=B3+B4;\ C4=B3-B4;\ C5=2*B5;\ C6=B2-B6;\ C7=B0-B7.$$

$$D0=C0+C3;\ D1=C1+C2;\ D2=C1-C2;\ D3=C0-C3;\ D4=\sqrt{2}*C4;\ D5=C5+C6;\ D6=C5-C6;\ D7=\sqrt{2}*C7.$$

$$E0=D0+D1;\ E1=D0-D1;\ E2=D2+D4;\ E3,\ E6=ROT(\sqrt{2}E6)[D3,D6];\ E4=D2-D4;\ E5=D5+D7;\ E7=D5-D7;$$

$$O0=E0;\ O4=E1;\ O1,\ O7=ROT(C7)[E2,E5];\ O6=E3;$$

$$O3,\ -O5=ROT(C-5)[E4,E7];\ O2=E6.$$

Apparatus for Providing Motion Compensated Video Stream

Figure 10:
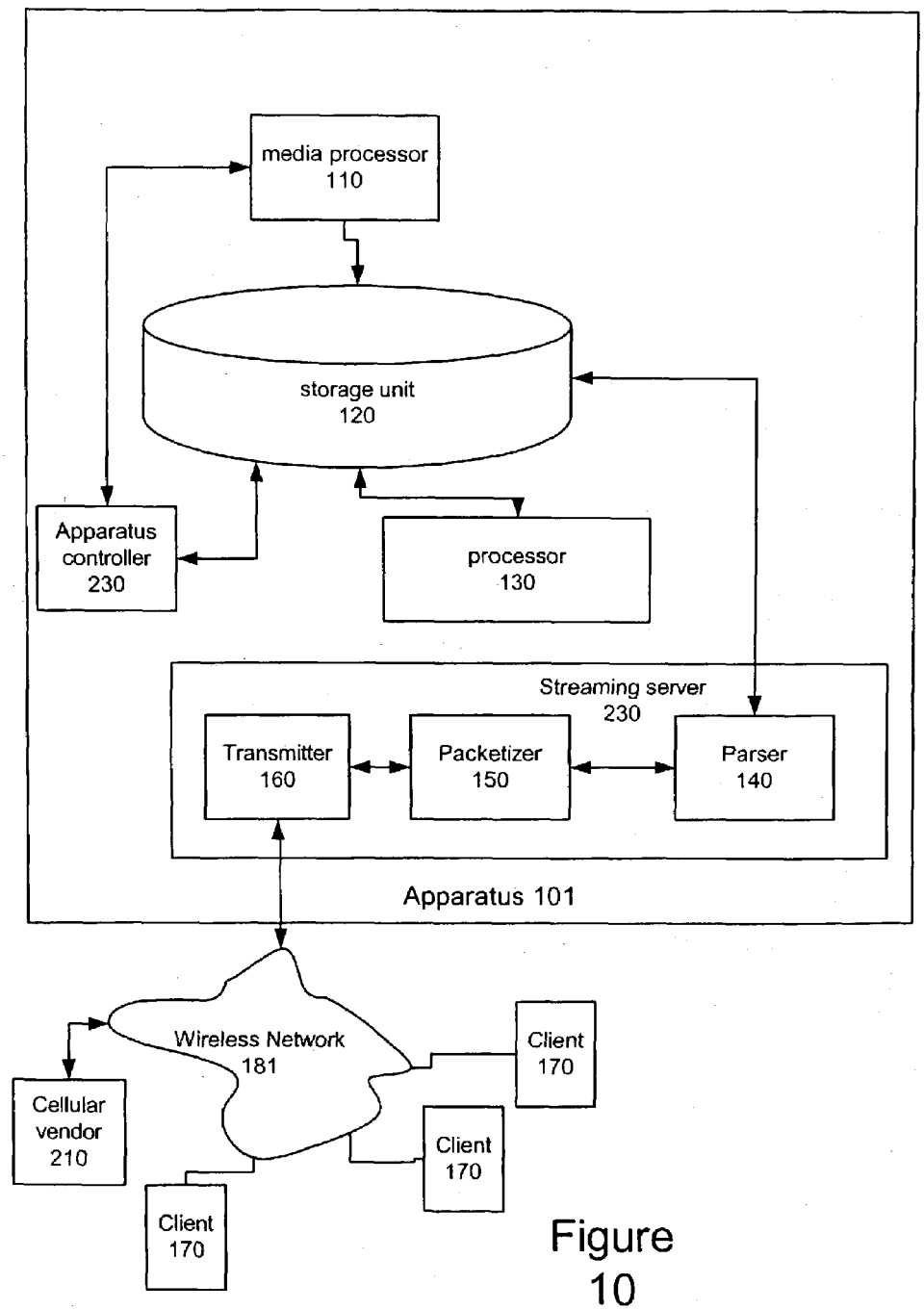
FIG. 10 illustrates an apparatus connected to multiple clients over a network, in accordance to an aspect of the invention.

FIG. 10 illustrates an apparatus 100 connected to multiple clients 170 over a network 180, in accordance to an aspect of the invention.

System 100 includes first media processor 110, storage unit 120, second media processor 130 (also termed apparatus), transmitter 160 and packet generator 145. Packet generator 145 preferably includes parser 140 and packetizer 150. Transmitter 160 is connected to multiple clients 170 over network 180. Packet generator 145 and transmitter may be included within a streaming server.

First media processor 110 is operable to receive video data, such as raw video stream, and to compress in according to a predefined compression scheme that includes DCT conversion. Conveniently, the compressed video is compressed according to standard compression schemes, such as MPEG 2, MPEG 4 and the like. provide standard compliant media streams and meta-data, such as MPEG 4 compliant media atoms and meta-data atoms.

First media processor 110 stores the compressed video streams at storage unit 120. Second media processor 130 is able to fetch the video streams and perform motion compensation information enhancement. Assuming that the compressed video is compressed according to standard compression schemes, such as but not limited to MPEG 2 or MPEG 4, the second media processor is operable to fetch a motion vector, extract H and V, select and fetch a group of reference blocks and a target block and to execute at least one of the methods mentioned above.

Apparatus controller 220 is connected to first media processor 110 and media storage unit 120 in order to manage the storage of a motion compensated video stream, but this is not necessarily so and in many cases the motion compensated version may replace the compressed video version.

The motion compensated version as well as the compressed video may be further manipulated by system 101 in manners known in the art to provide a video stream or multiplex of video streams to a client.

Parser 140, packetizer 150 and transmitter 160 co-operate to fetch, packetize and transmit video and audio (media) packets over network 180 to clients 170. Network 180 may include wireless network, cable network, and various networks and combination of network elements.

It will be appreciated that the preferred embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

We claim:

1. A method for generating encoded video data implementing a motion compensated matrix, the method comprising:
providing a motion vector and at least one input matrix of DCT coefficients;
selecting at least one conversion transform (CT) and at least one inverse conversion transform (ICT) in response to a content of the motion vector;
applying the at least one selected ICT and the at least one selected CT to provide a motion compensated matrix, wherein the at least one CT and at least one ICT are selected to best fit the motion vector to minimize an amount of calculations needed to provide the motion compensated matrix by omitting calculations that cancel each other during a sequence that includes applying a ICT that is followed by applying a CT; and encoding the video data implementing the motion compensated matrix.

2. The method of claim 1 wherein the at least one CT is a first type CT and wherein the at least one ICT is a first type ICT.

3. The method of claim 1 wherein the at least one CT is a second type CT and wherein the at least one ICT is a second type ICT.

4. The method of claim 1 wherein the CT and the ICT are one dimensional CT and ICT.

5. The method of claim 1 wherein applying the at least one selected ICT starts by applying a first selected ICT on the at least one input matrix to provide at least one intermediate element.

6. The method of claim 1 further comprising dividing the elements of the motion compensated matrix by a normalization factor.

7. A method for generating encoded video data implementing a motion compensated matrix, comprising:
receiving a motion vector and selecting a group of reference blocks that belong to a reference picture and determining a horizontal H and a vertical offset V between the members of the group and a target block;
selecting a row wise inverse conversion transform (ICT) and a row wise conversion transform (CT) in response to H;

applying the selected row wise ICT on rows of two reference blocks to provide a first intermediate matrix;

applying the selected row wise ICT on rows of other two reference blocks to provide a second intermediate matrix;

selecting a column wise ICT and a column wise CT in response to V;

applying the selected column wise ICT on the columns of the first and second intermediate matrixes to provide a third intermediate matrix;

applying the selected column wise CT on the columns of the third intermediate matrix to provide a fourth intermediate matrix;

applying the selected row wise CT on the rows of the fourth intermediate matrix to provide a motion compensated matrix; and encoding the video data implementing the motion compensated matrix.

8. The method of claim 7 wherein each block comprises N×N elements.

9. The method of claim 7 further comprising dividing the elements of the motion compensated matrix by a normalization factor.

10. The method of claim 7 wherein the at least one CT is a first type CT and wherein the at least one ICT is a first type ICT.

11. The method of claim 7 wherein the at least one CT is a second type CT and wherein the at least one ICT is a second type ICT.

12. A method for generating encoded video data implementing a motion compensated matrix, comprising:

receiving a motion vector and selecting a group of reference blocks that belong to a reference picture and determining a horizontal H and a vertical offset V between the members of the group and a target block;

selecting a column wise inverse conversion transform (ICT) and a column wise conversion transform (CT) in response to V;

applying the selected column wise ICT on columns of two reference blocks to provide a first intermediate matrix;

applying the selected column wise ICT on columns of other two reference blocks to provide a second intermediate matrix;

selecting a row wise ICT and a row wise CT in response to H;

applying the selected row wise ICT on the rows of the first and second intermediate matrixes to provide a third intermediate matrix;

applying the selected row wise CT on the rows of the third intermediate matrix to provide a fourth intermediate matrix;

applying the selected column wise CT on the column of the fourth intermediate matrix to provide a motion compensated matrix; and encoding the video data implementing the motion compensated matrix.

13. The method of claim 12 wherein each block comprises N×N elements.

14. The method of claim 12 further comprising dividing the elements of the motion compensated matrix by a normalization factor.

15. The method of claim 12 wherein the at least one CT is a first type CT and wherein the at least one ICT is a first type ICT.

16. The method of claim 12 wherein the at least one CT is a second type CT and wherein the at least one ICT is a second type ICT.

17. A method for generating encoded video data implementing a motion compensated matrix, comprising:

(i) receiving a motion vector and selecting a group of reference blocks that belong to a reference picture and determining a horizontal H and a vertical offset V between the members of the group and a target block;

(ii) determining if H is non zero and if V is non-zero, whereas if both H and V are non-zero performing the steps of:

selecting a row wise inverse conversion transform (ICT) and a row wise conversion transform (CT) in response to H;

applying the selected row wise ICT on rows of two reference blocks to provide a first intermediate matrix;

applying the selected row wise ICT on rows of other two reference blocks to provide a second intermediate matrix;

selecting a column wise ICT and a column wise CT in response to V;

applying the selected column wise ICT on the columns of the first and second intermediate matrixes to provide a third intermediate matrix;

applying the selected column wise CT on the columns of the third intermediate matrix to provide a fourth intermediate matrix;

applying the selected row wise CT on the rows of the fourth intermediate matrix to provide a motion compensated matrix;

(iii) if only H is non-zero performing the steps of:

selecting a row wise ICT and a row wise CT in response to H;

applying the selected row wise ICT on rows of two reference blocks to provide a first intermediate matrix;

applying the selected row wise CT on the rows of the first intermediate matrix to provide a motion compensated matrix;

(iv) if only V is non-zero performing the steps of:

selecting a column wise ICT and a column wise CT in response to V;

applying the selected column wise ICT on the columns of two reference blocks to provide a first intermediate matrix;

applying the selected column wise CT on the columns of the first intermediate matrix to provide a motion compensated matrix (v); and encoding the video data implementing the motion compensated matrix.

18. The method of claim 17 wherein each block comprises N×N elements.

19. The method of claim 18 wherein the at least one CT is a second type CT and wherein the at least one ICT is a second type ICT.

20. The method of claim 17 further comprising dividing the elements of the motion compensated matrix by a normalization factor.

21. The method of claim 20 wherein the at least one CT is a first type CT and wherein the at least one ICT is a first type ICT.

22. An apparatus for generating encoded video data implementing a motion compensated matrix, the apparatus comprises a media processor that is operable to receive a motion vector and at least one input matrix of DCT coefficients; select at least one conversion transform (CT) and at least one inverse conversion transform (ICT) in response to a content of the motion vector; and apply the at least one selected ICT and the at least one selected CT to provide a motion compensated matrix, wherein the at least one CT and at least one ICT are selected to best fit the motion vector to minimize an amount of calculations needed to provide the motion compensated matrix by omitting calculations that cancel each other during a sequence that includes applying a ICT that is followed by applying a CT; and encode the video data implementing the motion compensated matrix.

23. The apparatus of claim 22 coupled to a first media processor operable to compress media streams.

24. The apparatus of claim 22 wherein the at least one CT is a first type CT and wherein the at least one ICT is a first type ICT.

25. The apparatus of claim 22 wherein the at least one CT is a second type CT and wherein the at least one ICT is a second type ICT.

26. The apparatus of claim 22 wherein the CT and the ICT are one dimensional CT and ICT.

27. The apparatus of claim 22 operable to apply a first selected ICT on the at least one input matrix to provide at least one intermediate element.

28. A computer readable medium encoded with computer executable instructions having code embodied therein for causing an electronic device to encode video data performing the steps of:
- providing a motion vector and at least one input matrix of DCT coefficients;
- selecting at least one conversion transform (CT) and at least one inverse conversion transform (ICT) in response to a content of the motion vector;
- applying the at least one selected ICT and the at least one selected CT to provide a motion compensated matrix, wherein the at least one CT and at least one ICT are selected to best fit the motion vector to minimize an amount of calculations needed to provide the motion compensated matrix by omitting calculations that cancel each other during a sequence that includes applying a ICT that is followed by applying a CT; and encoding the video data implementing the motion compensated matrix.

* * * * *